(12) United States Patent
Taniguchi

(10) Patent No.: US 8,243,927 B2
(45) Date of Patent: Aug. 14, 2012

(54) DIGITAL VIDEO RECEIVER, ECM EXTRACT EQUIPMENT, EMM EXTRACT EQUIPMENT, SCRAMBLE KEY EXTRACT EQUIPMENT, CCI EXTRACT EQUIPMENT, DIGITAL VIDEO RECEIVING SYSTEM, ECM EXTRACT METHOD, EMM EXTRACT METHOD, SCRAMBLE KEY EXTRACT METHOD, CCI EXTRACT METHOD, DIGITAL VIDEO RECEIVING METHOD, AND RECORDING MEDIUM

(75) Inventor: Takashi Taniguchi, Osaka (JP)

(73) Assignee: Panasonic Corporation, Osaka (JP)

(*) Notice: Subject to any disclaimer, the term of this patent is extended or adjusted under 35 U.S.C. 154(b) by 822 days.

(21) Appl. No.: 11/873,493

(22) Filed: Oct. 17, 2007

(65) Prior Publication Data
US 2008/0095366 A1 Apr. 24, 2008

Related U.S. Application Data

(60) Provisional application No. 60/862,272, filed on Oct. 20, 2006.

(51) Int. Cl.
H04N 7/167 (2006.01)
H04L 29/06 (2006.01)
H04L 9/32 (2006.01)

(52) U.S. Cl. ........ 380/239; 380/211; 380/212; 380/228; 380/240; 713/155; 713/176

(58) Field of Classification Search .................. None
See application file for complete search history.

(56) References Cited

U.S. PATENT DOCUMENTS

| 7,552,457 | B2 * | 6/2009 | Van De Ven et al. | 725/31 |
| 7,636,846 | B1 * | 12/2009 | Eskicioglu | 713/176 |
| 2002/0114465 | A1 * | 8/2002 | Shen-Orr et al. | 380/231 |
| 2004/0228175 | A1 * | 11/2004 | Candelore et al. | 365/158 |
| 2005/0089168 | A1 * | 4/2005 | Kahre | 380/211 |
| 2006/0126839 | A1 * | 6/2006 | Koike et al. | 380/240 |
| 2007/0172059 | A1 * | 7/2007 | Yamaguchi et al. | 380/228 |
| 2007/0263866 | A1 * | 11/2007 | Yeh | 380/212 |
| 2008/0065548 | A1 * | 3/2008 | Muijen | 705/51 |
| 2008/0098212 | A1 * | 4/2008 | Helms et al. | 713/155 |
| 2008/0250444 | A1 * | 10/2008 | Thomas et al. | 725/25 |

* cited by examiner

Primary Examiner — Shin-Hon Chen
(74) Attorney, Agent, or Firm — RatnerPrestia

(57) ABSTRACT

A decryption process chip has a memory in which a first decryption control unit for decrypting a scramble key by using an ECM and an EMM is downloaded from outside and stored. A stream input unit extracts a packet including the ECM based on first information obtained from the first decryption control unit, and the first decryption control unit extracts the ECM from the packet. An STB control unit extracts only data including the EMM based on second information set up from the first decryption control unit, and the first decryption control unit extracts the EMM from the data. The stream input unit indirectly obtains a scramble key decrypted by the first decryption control unit so as to extract the scramble key and transmit it to a descrambler.

20 Claims, 16 Drawing Sheets

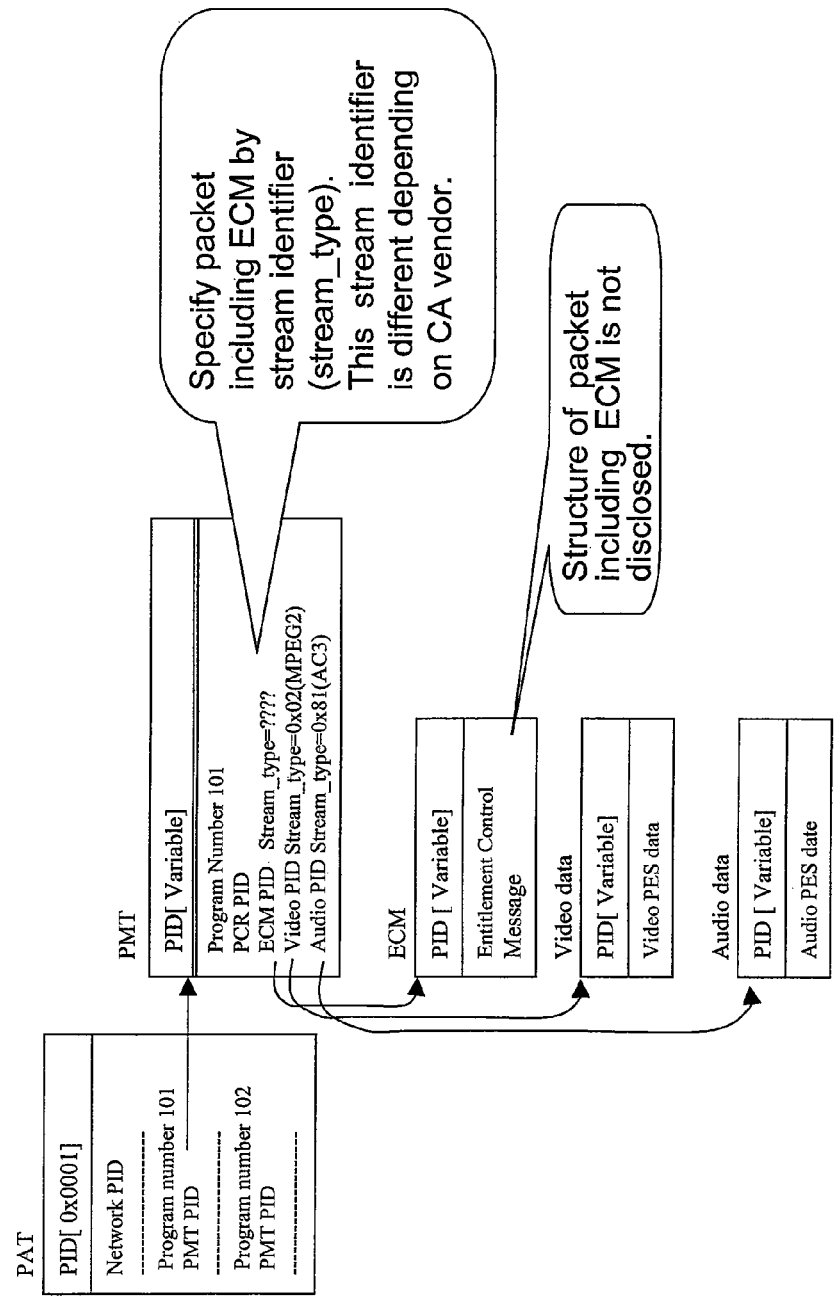

DIGITAL VIDEO RECEIVER, ECM EXTRACT EQUIPMENT, EMM EXTRACT EQUIPMENT, SCRAMBLE KEY EXTRACT EQUIPMENT, CCI EXTRACT EQUIPMENT, DIGITAL VIDEO RECEIVING SYSTEM, ECM EXTRACT METHOD, EMM EXTRACT METHOD, SCRAMBLE KEY EXTRACT METHOD, CCI EXTRACT METHOD, DIGITAL VIDEO RECEIVING METHOD, AND RECORDING MEDIUM

This application claims the benefit under 35 U.S.C. §119 (e) of U.S. provisional application 60/862,272 which is hereby incorporated by reference.

BACKGROUND OF THE INVENTION

1. Field of the Invention

The present invention relates to a digital video receiver, a digital video receiving method and the like used for a conditional access system (CAS), and for instance, to the digital video receiver, digital video receiving method and the like used for cable television, satellite broadcasting and the like.

2. Related Art of the Invention

In recent years, a conditional access system (CAS) is widely used for cable television, satellite broadcasting and the like as a method of exclusively broadcasting to specific viewers.

For instance, a scramble signal is added to a broadcast wave in advance, and in the case of only broadcasting to the specific viewers such as pay-TV, a device for canceling the scramble signal (an STB or the like) is provided only to subscribers. If such a measure is taken, the subscribers can view the pay-TV by using the STB. However, non-subscribers cannot cancel the scramble signal so that they can receive but cannot view a broadcast to which the CAS is applied.

Encryption is differently performed by using a different scramble key to each individual channel so as to allow only the channel under subscription to be viewed even in the case of the STB being possessed.

In the United States, a CableCARD is used as the method of the CAS these days.

FIG. 15 shows a block diagram for describing a mechanism of decryption process of the STB in the CAS using the CableCARD.

An STB 100 is the STB for cable TV installed in each individual household, and an H/E (Head End) 101 is a cable TV station for instance.

A CableCARD 102 is a PC card of the PCMCIA standard, and includes a CAS module 104 for decrypting the scramble key and a descrambler 105 for descrambling a broadcast signal.

To decrypt the scramble key, two kinds of information of an ECM (Entitlement Control Message) and an EMM (Entitlement Management Message) are necessary. The ECM is information per program, and the EMM is information per subscriber.

On the STB 100's body side, a card slot of the PCMCIA standard is provided, and the CableCARD 102 is inserted into the card slot. If the CableCARD 102 is not inserted, the STB 100 cannot descramble the broadcast signal so that viewing is impossible.

As there is the descrambler 105 in the CableCARD 102, there is no need to deliver the scramble key between the CableCARD 102 and the STB 100.

A video/audio output control portion 103 passes a CA_PMT having descriptors other than a CA descriptor deleted from a PMT (Program Map Table) received in-band to the CAS module 104 of the CableCARD 102.

The CAS module 104 extracts the ECM from the CA_PMT passed from the video/audio output control portion 103, and also extracts the EMM required by the STB 100 out of data including information on multiple different EMMs received from OOB. And the CAS module 104 decrypts the scramble key by using a master key possessed in the CableCARD 102 in advance and the extracted ECM and EMM so as to pass the decrypted scramble key to the descrambler 105.

And the descrambler 105 descrambles the broadcast signal by using the scramble key and passes it to the video/audio output control portion 103. As descrambled video data is outputted from the video/audio output control portion 103, the user can view that broadcast program.

Here, the relation between the PMT and the ECM will be described. FIG. 16 is a diagram showing the relation between the PMT and the ECM.

The PMT is a table equivalent to one channel, and a PAT (Program Allocation Table) transmitted in-band includes PIDs of all the channels of PMT. And the PMT includes the PID of a packet including the ECM together with the PID of video data and audio data.

A stream identifier (stream_type) can specify the packet including the ECM out of the PMT. However, the stream identifier is different depending on a CA vendor. The structure of the packet including the ECM has not been disclosed.

It is not possible to extract the ECM out of the stream without having information on a transmitting side, such as the stream identifier specifying the packet including the ECM and the structure of the packet including the ECM.

In the case of the CAS before using the CableCARD, the ECM could not be extracted and the scramble key could not be decrypted without knowing the information on the transmitting side. Therefore, a receiver could not be manufactured without knowing the information on the transmitting side.

As for the CAS using the CableCARD 102 shown in FIG. 15, the STB 100 has only to extract the CA_PMT out of the PMTs and pass it to the CableCARD 102 as a decryption process. The process of extracting the CA_PMT is a process that can be performed just by using the disclosed information.

To be more specific, in the case of the CAS using the CableCARD 102, the CableCARD 102 performs the decryption process. Therefore, it is now possible to manufacture the STB 100 without knowing such information on the transmitting side as described above.

DISCLOSURE OF THE INVENTION

Problems to be Solved by the Invention

However, the CAS using the CableCARD has not widely diffused yet because there is a problem of high cost.

To be more specific, a chip for the descrambler and a high-performance CPU had to be provided in a narrow packaging area of the CableCARD being a PC-card size, and the slot of the PCMCIA also had to be provided on the STB body side. The cost became high for such a reason.

Furthermore, the CableCARD had to be prepared for each CA vendor. Therefore, it had to be replaced by another CableCARD in the case where the CA vendor was changed for instance, which showed lack of general versatility.

SUMMARY OF THE INVENTION

The present invention solves the above-mentioned conventional problems, and an object thereof is to provide a digital video receiver, which can be manufactured without knowing the information on the transmitting side necessary for a decryption process and at low cost and which is rich in general versatility, and a digital video receiving method and the like.

The first aspect of the present invention is a digital video receiver, comprising:

an STB control unit which has data including no EMM and data including an EMM inputted thereto;

a stream input unit which has a stream including an ECM inputted thereto;

a decryption process chip including a memory in which a first decryption control unit for decrypting a scramble key by using the ECM and the EMM is downloaded from outside and stored; and a descrambler which descrambles received video receiving data by utilizing the scramble key, wherein:

the stream input unit extracts a packet including the ECM based on first information obtained from the first decryption control unit, and transmits it to the first decryption control unit so that the first decryption control unit extracts the ECM from the packet including the ECM;

the STB control unit extracts only the data including the EMM based on second information set up from the first decryption control unit, and transmits it to the first decryption control unit so that the first decryption control unit extracts the EMM from the data including the EMM; and the stream input unit transmits the scramble key indirectly obtained from the first decryption control unit to the descrambler.

The second aspect of the present invention is ECM extract equipment, comprising:

a second decryption control unit which notifies first information for extracting a packet including an ECM out of a stream including the ECM;

a stream input unit which has the stream including the ECM inputted thereto and extracts the packet including the ECM based on the first information obtained from the second decryption control unit;

a first decryption control unit which extracts the ECM from the packet including the ECM extracted by the stream input unit; and a decryption process chip which performs a decryption process, wherein:

the first decryption control unit is software downloaded to a memory on the decryption process chip from outside; and the second decryption control unit is software downloaded to a memory different from the memory on the decryption process chip from outside.

The third aspect of the present invention is EMM extract equipment, comprising:

a first decryption control unit which generates second information including information for, out of data including an EMM and data including no EMM, extracting only the data including the EMM and extracts the EMM from the data including the EMM;

an STB control unit which has the data including the EMM and the data including no EMM inputted thereto, extracts only the data including the EMM based on the second information set up from the first decryption control unit and transmits it to the first decryption control unit; and a decryption process chip which performs a decryption process, wherein:

the first decryption control unit is software downloaded to a memory on the decryption process chip from outside.

The fourth aspect of the present invention is Scramble key extract equipment, comprising:

a first decryption control unit which generates fourth information including a scramble key restored from an ECM and an EMM;

a stream input unit which extracts the scramble key from the fourth information obtained from the first decryption control unit;

a descrambler which descrambles received video receiving data by utilizing the scramble key obtained from the stream input unit; and a decryption process chip which performs a decryption process, wherein:

the first decryption control unit is software downloaded to a memory on the decryption process chip from outside.

The fifth aspect of the present invention is CCI extract equipment, comprising:

a first decryption control unit which generates fourth information including CCI;

a stream input unit which extracts the CCI from the fourth information obtained from the first decryption control unit;

a video/audio output control portion which outputs inputted video receiving data according to the CCI obtained from the stream input unit; and a decryption process chip which performs a decryption process, wherein:

the first decryption control unit is software downloaded to a memory on the decryption process chip from outside.

The sixth aspect of the present invention is a digital video receiver, comprising:

the ECM extract equipment comprising:

a second decryption control unit which notifies first information for extracting a packet including an ECM out of a stream including the ECM;

a stream input unit which has the stream including the ECM inputted thereto and extracts the packet including the ECM based on the first information obtained from the second decryption control unit;

a first decryption control unit which extracts the ECM from the packet including the ECM extracted by the stream input unit; and a decryption process chip which performs a decryption process, wherein:

the first decryption control unit is software downloaded to a memory on the decryption process chip from outside; and the second decryption control unit is software downloaded to a memory different from the memory on the decryption process chip from outside;

the EMM extract equipment comprising:

a first decryption control unit which generates second information including information for, out of data including an EMM and data including no EMM, extracting only the data including the EMM and extracts the EMM from the data including the EMM;

an STB control unit which has the data including the EMM and the data including no EMM inputted thereto, extracts only the data including the EMM based on the second information set up from the first decryption control unit and transmits it to the first decryption control unit; and a decryption process chip which performs a decryption process, wherein:

the first decryption control unit is software downloaded to a memory on the decryption process chip from outside; and the scramble key extract equipment comprising:

a first decryption control unit which generates fourth information including a scramble key restored from an ECM and an EMM;

a stream input unit which extracts the scramble key from the fourth information obtained from the first decryption control unit;

a descrambler which descrambles received video receiving data by utilizing the scramble key obtained from the stream input unit; and a decryption process chip which performs a decryption process, wherein:

the first decryption control unit is software downloaded to a memory on the decryption process chip from outside.

The seventh aspect of the present invention is the digital video receiver according to the sixth aspect of the present invention, further comprising the CCI extract equipment comprising:

a first decryption control unit which generates fourth information including CCI;

a stream input unit which extracts the CCI from the fourth information obtained from the first decryption control unit;

a video/audio output control portion which outputs inputted video receiving data according to the CCI obtained from the stream input unit; and a decryption process chip which performs a decryption process, wherein:

the first decryption control unit is software downloaded to a memory on the decryption process chip from outside.

The eighth aspect of the present invention is a digital video receiver, comprising:

a decryption process chip for performing a decryption process, including a memory for storing decryption process software downloaded from outside; and an Ether chip for controlling Ethernet data, which has another MAC address for the decryption process chip apart from the MAC address used to assign an IP address used when receiving video receiving data from outside.

The ninth aspect of the present invention is a digital video receiving system, comprising:

the digital video receiver according to the sixth aspect of the present invention;

a digital video transmitter which transmits video data including an ECM, data including no EMM and data including an EMM and causes the first decryption control unit and the second decryption control unit to be downloaded to the digital video receiver; and a communication line which connects the digital video transmitter with the digital video receiver.

The tenth aspect of the present invention is an ECM extract method, comprising the steps in which:

a second decryption control unit notifies a stream input unit of first information for extracting a packet including an ECM out of a stream including the ECM, the second decryption control unit downloaded to a memory different from the memory on a decryption process chip for performing a decryption process from outside;

the stream input unit extracts the packet including the ECM out of the inputted stream including the ECM based on the first information; and a first decryption control unit extracts the ECM from the extracted packet including the ECM, the first decryption control unit downloaded to the memory on the decryption process chip from outside.

The eleventh aspect of the present invention is an EMM extract method, comprising the steps in which:

a first decryption control unit generates second information including information for, out of data including an EMM and data including no EMM, extracting only the data including the EMM, the first decryption control unit downloaded to a memory on a decryption process chip for performing a decryption process from outside;

an STB control unit extracts, based on the second information, only the data including the EMM from the data including the EMM and data including no EMM which are inputted; and the first decryption control unit extracts the EMM from the extracted data including the EMM.

The twelfth aspect of the present invention is a scramble key extract method, comprising the steps in which:

a first decryption control unit generates fourth information including a scramble key restored from an ECM and an EMM, the first decryption control unit downloaded to a memory on a decryption process chip for performing a decryption process from outside;

a stream input unit extracts the scramble key from the fourth information; and a descrambler descrambles received video receiving data by utilizing the scramble key extracted by the stream input unit.

The thirteenth aspect of the present invention is a CCI extract method, comprising the steps in which:

a first decryption control unit generates fourth information including CCI, the first decryption control unit downloaded to a memory on a decryption process chip for performing a decryption process from outside;

a stream input unit extracts the CCI from the fourth information; and a video/audio output control portion outputs inputted video receiving data according to the CCI extracted by the stream input unit.

The fourteenth aspect of the present invention is a digital video receiving method, comprising:

the ECM extract method according to the tenth aspect of the present invention;

the EMM extract method, comprising the steps in which:

a first decryption control unit generates second information including information for, out of data including an EMM and data including no EMM, extracting only the data including the EMM, the first decryption control unit downloaded to a memory on a decryption process chip for performing a decryption process from outside;

an STB control unit extracts, based on the second information, only the data including the EMM from the data including the EMM and data including no EMM which are inputted; and the first decryption control unit extracts the EMM from the extracted data including the EMM; and the scramble key extract method comprising the steps in which:

a first decryption control unit generates fourth information including a scramble key restored from an ECM and an EMM, the first decryption control unit downloaded to a memory on a decryption process chip for performing a decryption process from outside;

a stream input unit extracts the scramble key from the fourth information; and a descrambler descrambles received video receiving data by utilizing the scramble key extracted by the stream input unit.

The fifteenth aspect of the present invention is the digital video receiving method, comprising:

the ECM extract method according to the tenth aspect of the present invention;

the EMM extract method, comprising the steps in which:

a first decryption control unit generates second information including information for, out of data including an EMM and data including no EMM, extracting only the data including the EMM, the first decryption control unit downloaded to a memory on a decryption process chip for performing a decryption process from outside;

an STB control unit extracts, based on the second information, only the data including the EMM from the data including the EMM and data including no EMM which are inputted; and the first decryption control unit extracts the EMM from the extracted data including the EMM; and the scramble key extract method comprising the steps in which:

a first decryption control unit generates fourth information including a scramble key restored from an ECM and an EMM, the first decryption control unit downloaded to a memory on a decryption process chip for performing a decryption process from outside;

a stream input unit extracts the scramble key from the fourth information; and a descrambler descrambles received video receiving data by utilizing the scramble key extracted by the stream input unit, further comprising the CCI extract method comprising the steps in which:

a first decryption control unit generates fourth information including CCI, the first decryption control unit downloaded to a memory on a decryption process chip for performing a decryption process from outside;

a stream input unit extracts the CCI from the fourth information; and a video/audio output control portion outputs inputted video receiving data according to the CCI extracted by the stream input unit.

The sixteenth aspect of the present invention is a computer-processable recording medium having a program recorded therein to cause a computer to function as the stream input unit of the ECM extract equipment according to the second aspect of the present invention.

The seventeenth aspect of the present invention is a computer-processable recording medium having a program recorded therein to cause a computer to function as the STB control unit of the EMM extract equipment according to the third aspect of the present invention.

The eighteenth aspect of the present invention is a computer-processable recording medium having a program recorded therein to cause a computer to function as the stream input unit and the descrambler of the scramble key extract equipment according to the fourth aspect of the present invention.

The nineteenth aspect of the present invention is a computer-processable recording medium having a program recorded therein to cause a computer to function as the stream input unit and the video/audio output control portion of the CCI extract equipment according to the fifth aspect of the present invention.

The twentieth aspect of the present invention is a computer-processable recording medium having a program recorded therein to cause a computer to function as the stream input unit, the STB control unit, the descrambler and the first decryption control unit and/or the second decryption control unit of the digital video receiver according to the sixth aspect of the present invention.

The present invention can provide a digital video receiver, which can be manufactured without knowing the information on the transmitting side necessary for the decryption process, and at low cost and which is rich in general versatility, and a digital video receiving method and the like.

BRIEF DESCRIPTION OF THE DRAWINGS

FIG. 16 is a diagram showing a relation between a PMT and an ECM.

Figure 1:
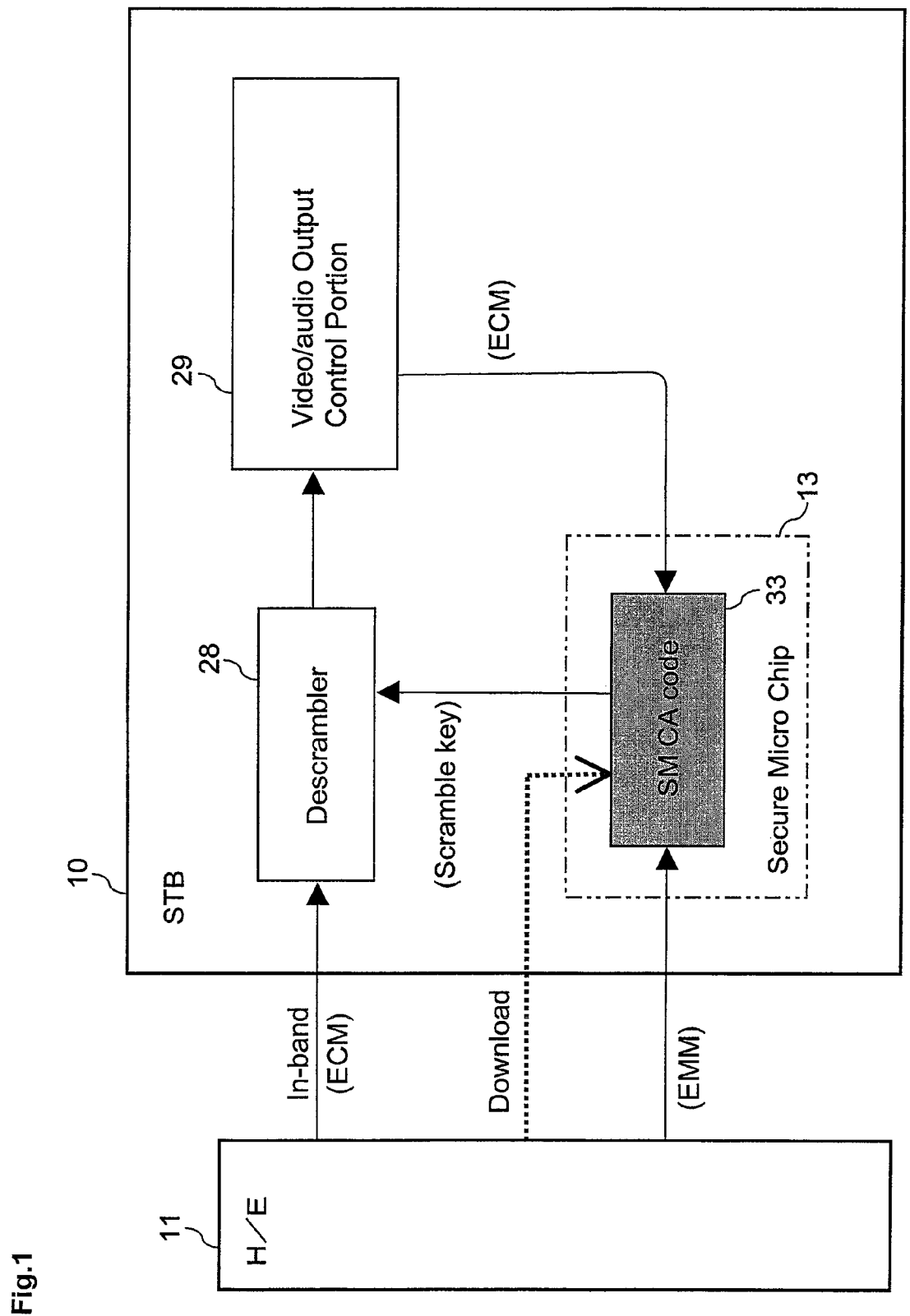
FIG. 1 is an overview block diagram showing a flow of a decryption process of an STB according to a first embodiment of the present invention.

DESCRIPTION OF SYMBOLS 10, 35, 40 STB
11, 41 H/E
12, 43 DCAS HOST
13, 46 Secure micro chip
20 Application
21 CA Java application
22 OCAP implementation
23 Middleware/OS
24 DSG client controller
25 Transport driver
26 DCAS controller 27 SM driver
28 Descrambler
29 Video/audio output control portion
30, 44 eCM
31 Inband tuner
32 SM interface
33 SM CA code
34 DCAS extension API
42 DHCP server
45 Ether chip
100 Digital video receiver
101 H/E
102 CableCARD
103 Video/audio output control portion
104 CAS module
105 Descrambler

PREFERRED EMBODIMENTS OF THE INVENTION

Hereafter, embodiments of the present invention will be described with reference to the drawings.

First Embodiment

FIG. 1 shows an overview block diagram showing a flow of a decryption process of an STB according to a first embodiment of the present invention.

Figure 15:
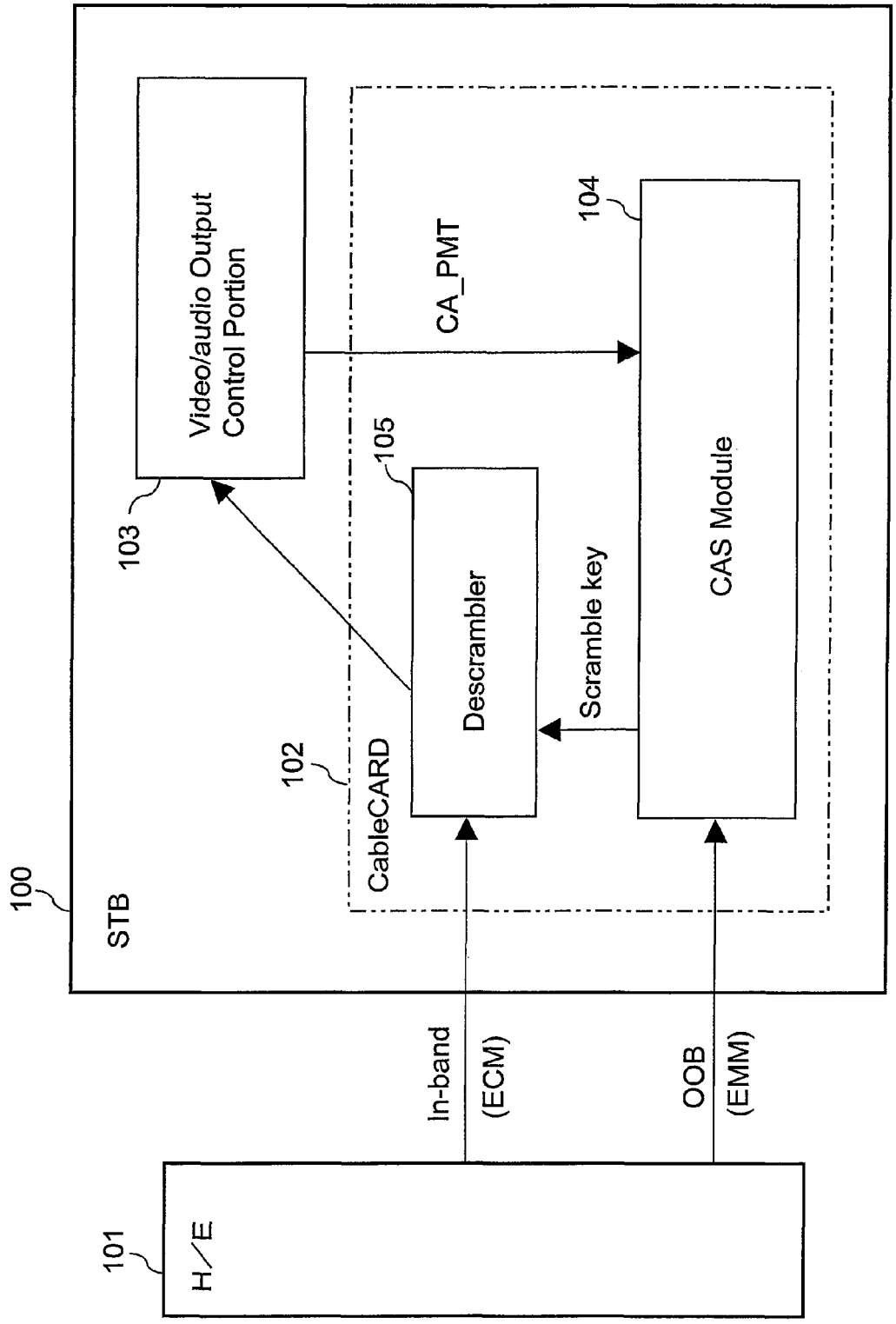
FIG. 15 is an overview block diagram for describing a conventional decryption process of the STB in a CAS using a CableCARD.

According to the first embodiment, a card for the decryption process such as a CableCARD 102 shown in FIG. 15 is not used. A chip for the decryption process is mounted on an STB 10, and software necessary for the decryption process is downloaded to the chip so as to let the software perform the decryption process.

The STB 10 of the first embodiment has a secure micro chip 13 dedicated to performing the decryption process mounted thereon. Therefore, it is possible to maintain high confidentiality as to the process performed by the secure micro chip 13.

The STB 10 of the first embodiment is an example of each of a digital video receiver, ECM extract equipment, EMM extract equipment, scramble key extract equipment and CCI extract equipment of the present invention.

The secure micro chip 13 has an area capable of storing the downloaded software, where an SM CA code 33 which is the software for the decryption process is downloaded from an H/E 11. The software in this specification refers to programs and data. A memory of the present invention to which the software is downloaded is not limited to a dynamic storage area such as a RAM but also includes a static storage area such as a flash memory or an EEPROM.

As is in common with other drawings, a daubed block (SM CA code 33 in FIG. 1) shows a downloaded software portion.

FIG. 1 shows a configuration in which only one STB 10 is connected to one H/E 11. As the STB 10 is installed in each household, however, multiple STBs 10 are connected to one H/E 11 in reality. In FIG. 1, communication lines for receiving In-band, Download and EMM are separately described. However, they physically share one communication line for broadcasting video data. Moreover, DOCSIS/DSG or the like is used for the line for receiving the EMM.

The H/E 11 is an example of a digital video transmitter of the present invention. And a configuration in which the STB 10 and the H/E 11 are combined with the communication line for connecting them is an example of a digital video receiving system of the present invention.

Out of information received in-band, a video/audio output control portion 29 passes the information including an ECM to the SM CA code 33. Here, the "information including an ECM" may be either a CA_PMT used in the case of the CableCARD 102 of FIG. 15 or other information.

Data including the information on multiple different EMMs received from a line for receiving the EMM is inputted to the SM CA code 33. The EMM necessary for the STB 10 is extracted out of the data.

The SM CA code 33 restores a scramble key from the extracted ECM and EMM, and creates the data including the scramble key. A descrambler 28 descrambles a broadcast signal by using the scramble key, and passes it to the video/audio output control portion 29. As descrambled video data is outputted from the video/audio output control portion 29, the user can view that broadcast program.

The downloaded SM CA code 33 performs the decryption process by using a decryption processing function which the secure micro chip 13 has. Therefore, the STB 10 can be manufactured without knowing undisclosed information on the transmitting side as in the case of the CableCARD of FIG. 15. The SM CA code 33 to be downloaded is developed for instance by a CA vendor who knows the information on the transmitting side.

Next, a description will be given as to details of a decryption processing method of the STB 10 according to the first embodiment.

Figure 2:
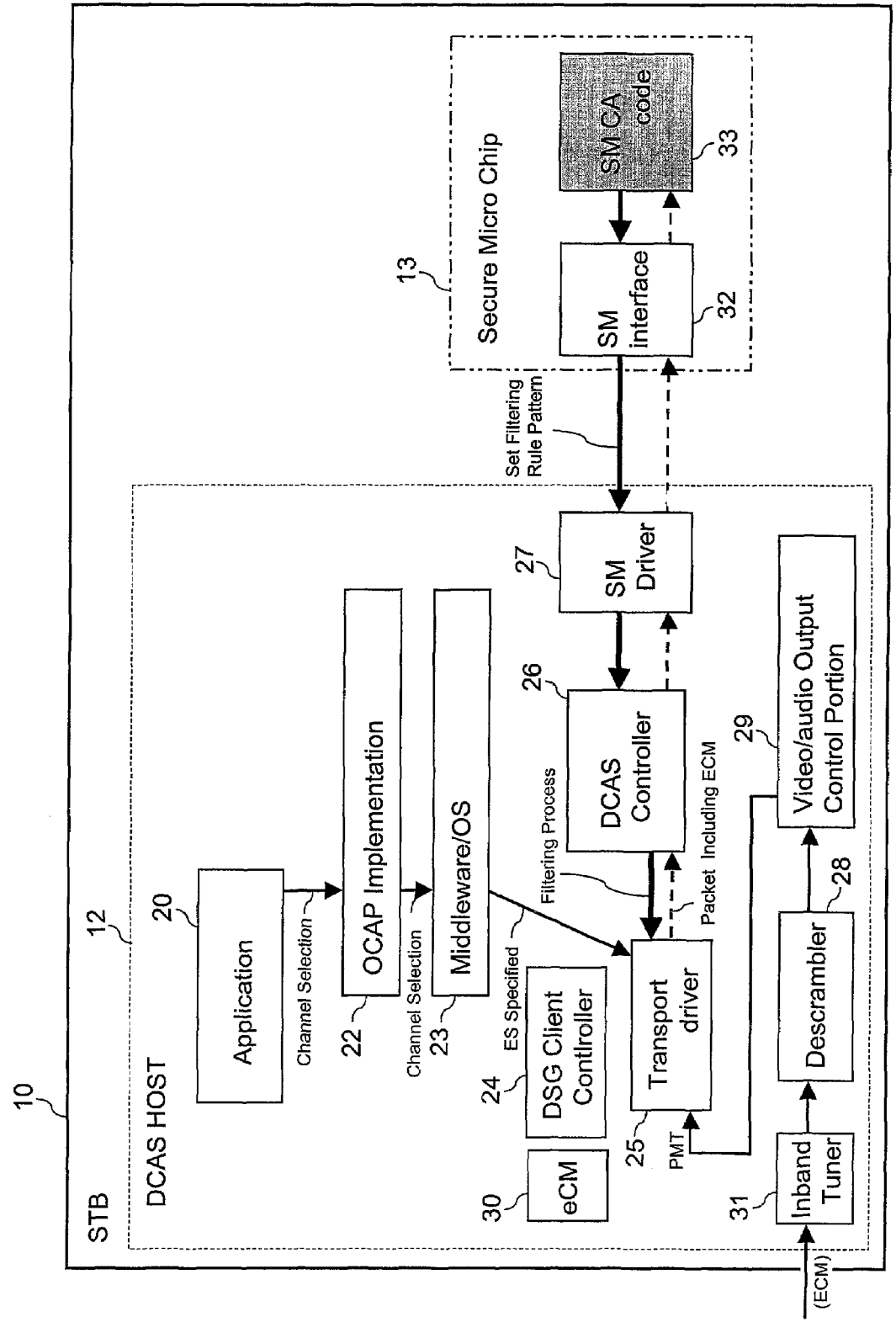
FIG. 2 is a block diagram showing the flow of an ECM extraction process of the STB according to the first embodiment of the present invention.
Figure 3:
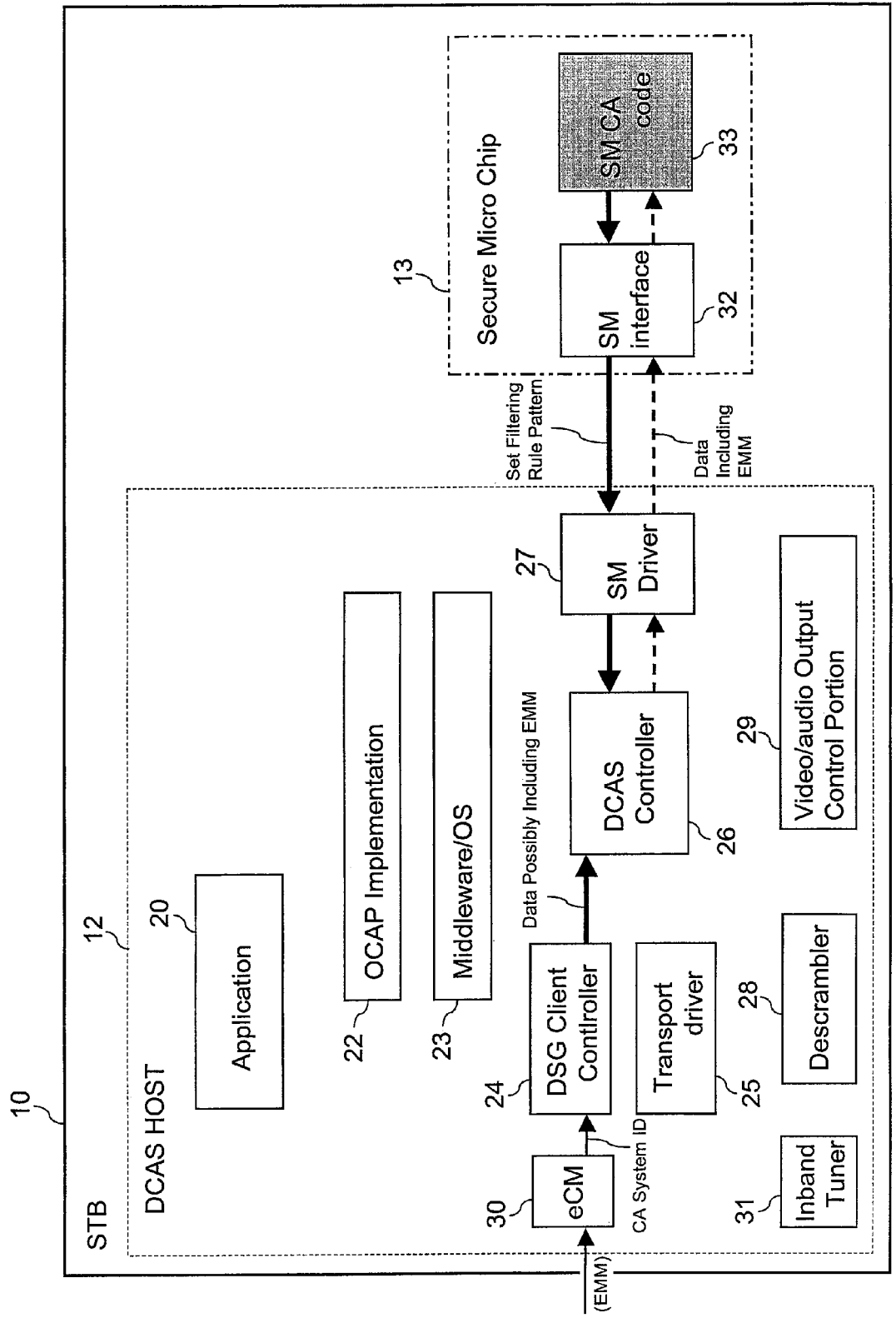
FIG. 3 is a block diagram showing the flow of an EMM extraction process of the STB according to the first embodiment of the present invention.
Figure 4:
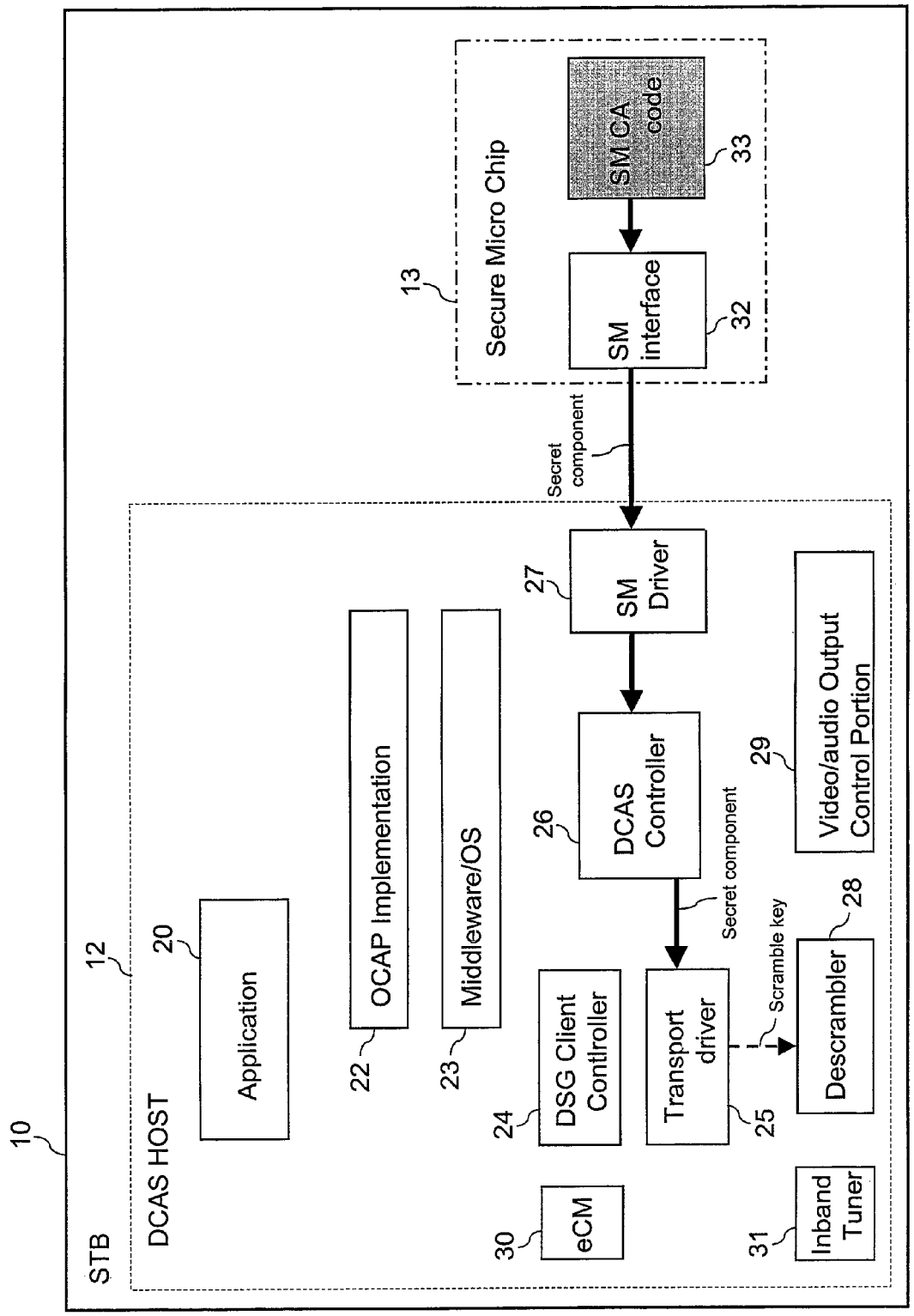
FIG. 4 is a block diagram showing the flow of a scramble key extraction process of the STB according to the first embodiment of the present invention.

FIGS. 2 to 4 show block diagrams showing the flow of steps of the decryption process for the STB 10 according to the first embodiment. FIG. 2 shows the flow of ECM extraction, FIG. 3 shows the flow of EMM extraction, and FIG. 4 shows the flow of a scramble key extraction respectively.

Figure 5:
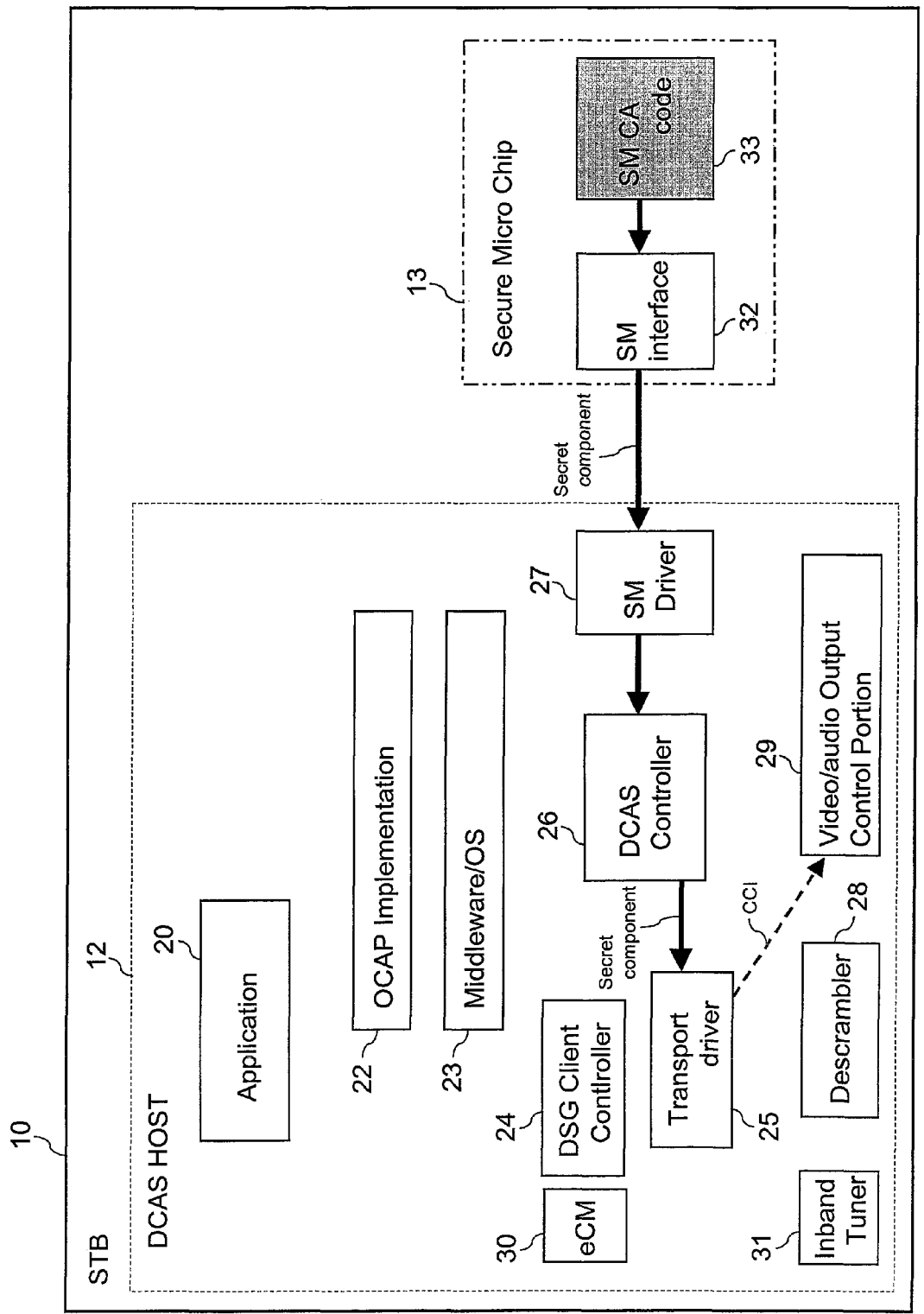
FIG. 5 is a block diagram showing the flow of a CCI extraction process of the STB according to the first embodiment of the present invention.

FIG. 5 is a block diagram showing the flow of CCI (Copy Control Information) extraction of the STB 10 according to the first embodiment, which also describes the process of the CCI extraction.

The block diagrams of the STB 10 of FIGS. 2 to 5 show the details of the STB 10 of FIG. 1, where the portions having the same symbols as FIG. 1 indicate the same components as those in FIG. 1. While a description of the H/E 11 is omitted in FIGS. 2 to 5, the STB 10 is connected to the H/E 11 and used as in FIG. 1.

The portion of a DCAS HOST 12 enclosed by a broken line in the STB 10 shown in FIGS. 2 to 5 indicate the portion other than the secure micro chip 13 on the STB 10.

As described in FIG. 1, the SM CA code 33 in the secure micro chip 13 is downloaded from the H/E 11 in advance before receiving the broadcast signal so as to restore the scramble key upon receiving the broadcast signal.

The secure micro chip 13 has an SM interface 32. Sending and receiving of the data between the DCAS HOST 12 and the secure micro chip 13 is performed by an SM driver 27 existing in the DCAS HOST 12 and the SM interface 32.

The DCAS HOST 12 includes an OCAP implementation 22 for executing an application of an OCAP (Open Cable Application Platform) on the STB 10 and a middleware/OS 23 which is software for providing basic functions required as the STB 10. Moreover, the first embodiment shows an example in which the OCAP is adopted. However, software of specifications other than the OCAP may also be used. In that case, the portion of the OCAP implementation 22 becomes the software compliant with the specifications.

The DCAS HOST 12 also includes a DCAS controller 26 which is the software for controlling the entire STB 10 and a transport driver 25 for extracting necessary data out of the data received from an in-band tuner and transmitting it to the DCAS controller 26. The DCAS HOST 12 also includes a DSG client controller 24 for controlling data delivery to a module which exchanges the data by using a DSG (DOCSIS Set-top Gateway).

The DCAS HOST 12 further includes an application 20 for realizing various types of operation on the STB 10. For instance, it is possible to realize channel selection operation, display of a program listing, video on demand, games and the like by operating a remote control.

In addition, the DCAS HOST 12 includes an inband tuner 31 for receiving the data from the In-band and an eCM (Embedded Cable Modem) 30 for receiving the data from the line for receiving the EMM.

The secure micro chip 13, the transport driver 25, the DCAS controller 26 and the SM CA code 33 are examples of the chip for the decryption process, a stream input unit, an STB control unit and a first decryption control unit of the present invention, respectively.

Next, a description will be given by using FIGS. 2 to 4 as to details of a scramble key restoration process of the STB 10 according to the first embodiment.

First, details of an ECM extraction process will be described by using FIG. 2.

If the channel selection operation is performed by the application 20, the OCAP implementation 22 and the middleware/OS 23 are notified of channel selection information. And the middleware/OS. 23 specifies an ES (Elementary Stream) to the transport driver 25.

The SM CA code 33 sets up a filtering rule pattern having set up a filter for specifying stream_type of a packet including the ECM of a private section on the DCAS controller 26 via the SM interface 32 and the SM driver 27. And the DCAS controller 26 sets up the filter on the transport driver 25.

Moreover, the stream_type is an example of first information of the present invention, and the filtering rule pattern generated by the SM CA code 33 is an example of second information of the present invention.

The video/audio output control portion 29 inputs a PMT extracted out of the data inputted from the inband tuner 31 via the descrambler 28 to the transport driver 25.

And the transport driver 25 extracts the packet including the ECM out of the PMT inputted from the video/audio output control portion 29 according to the filter setup so as to transmit the packet to the SM CA code 33 via the DCAS controller 26, the SM driver 27 and the SM interface 32. The SM CA code 33 extracts the ECM out of the packet.

A broken line arrow shown in FIG. 2 indicates the flow of the packet including the ECM of the stream_type set up by the SM CA code 33.

In the case of a temporary rule set, the rule is reset upon selecting a channel. Therefore, the SM CA code 33 sets the filter each time a channel is selected.

A conventional CAS did not allow the stream_type to be changed without a change of hardware and the like. Even in the case of the CAS using the CableCARD shown in FIG. 15 for instance, the information on the stream_type was set up in the CableCARD 102 so that replacement of the CableCARD 102 or the like was required in order to change the stream_type. In comparison, in the case of the STB 10 of the first embodiment, the information on the stream_type is included in the software of the SM CA code 33. Therefore, it is possible to change the stream_type just by redownloading the SM CA code 33 without changing the hardware and the like.

Next, details of the EMM extraction process will be described by using FIG. 3.

The DSG client controller 24 extracts the data which may include the EMM intended for the STB 10 by determining destinations out of the data (CA System ID) rendered as a session received by the eCM 30, and transmits the data to the DCAS controller 26.

The SM CA code 33 sets up the filtering rule pattern on the DCAS controller 26 via the SM interface 32 and the SM driver 27. The SM CA code 33 has set up a condition for extracting the data including the EMM in the filtering rule pattern.

In that case, the filtering rule pattern generated by the SM CA code 33 is an example of the second information of the present invention.

As for the filtering rule pattern, the filter for extracting the packet including the ECM described in FIG. 2 may be simultaneously set up and the setup is transmitted to the DCAS controller 26.

The DCAS controller 26 uses the filtering rule pattern and discards the data from which the EMM is unextractable out of the data possibly including the EMM passed from the DSG client controller 24 so as to only transmit the data from which the EMM has been able to be extracted to the SM CA code 33 via the SM driver 27 and the SM interface 32.

The broken line arrow shown in FIG. 3 indicates the flow of the data including the EMM. The data including the EMM also includes a connection ID, a filter ID and the like in addition to the EMM.

Next, details of the scramble key extraction process will be described by using FIG. 4.

The SM CA code 33 decrypts the scramble key from the ECM and the EMM by using a master key, and generates a secret component which includes its scramble key. And the SM CA code 33 transmits the secret component to the transport driver 25 via the SM interface 32, the SM driver 27 and the DCAS controller 26.

The secret component generated by the SM CA code 33 is an example of fourth information of the present invention.

The transport driver 25 extracts the scramble key from the received secret component, and passes it to the descrambler 28.

In the scramble key extraction process of the first embodiment shown in FIG. 4, it is assumed that the transport driver 25 can extract the scramble key from the secret component, which is based on the premise that the format of the secret component has been disclosed. In the case where the format of the secret component is disclosed, it is considered that the scramble key is frequently (every second for instance) changed so as to avoid any trouble due to the disclosure.

Next, details of the CCI extraction process will be described by using FIG. 5.

As with the scramble key extraction process described in FIG. 4, the SM CA code 33 creates the secret component and transmits it to the transport driver 25. In that case, the SM CA code 33 creates the secret component including the CCI.

And the transport driver 25 extracts the CCI from the received secret component and passes it to the video/audio output control portion 29.

Through the above process, the video data inputted is descrambled with the scramble key by the descrambler 28 and inputted to the video/audio output control portion 29 so that the video data according to the CCI is outputted from the video/audio output control portion 29.

As for the STB 10 of the first embodiment, the secure micro chip 13 has only to perform the decryption process. Thus, the secure micro chip 13 does not need a high throughput. The STB 10 does not need to be provided with a PCMCIA slot or the like so that it can be manufactured at low cost. Furthermore, even in the case where the CA vendor changes, only the SM CA code 33 has to be redownloaded without necessity to change the hardware or the like. Therefore, the STB 10 has high general versatility.

Thus, the STB 10 of the first embodiment enjoys the advantage of the CableCARD that the receiver can be manufactured without knowing the information necessary for the decryption process, and at the same time, it can be manufactured at lower cost than the CableCARD and is rich in general versatility.

Second Embodiment

Next, a description will be given as to the decryption process and the CCI extraction process of the STB according to a second embodiment of the present invention.

The second embodiment has a configuration in which the software can be downloaded on the memory of the STB as well as on the secure micro chip 13 in addition to the configuration of the first embodiment shown in FIG. 1.

Figure 6:
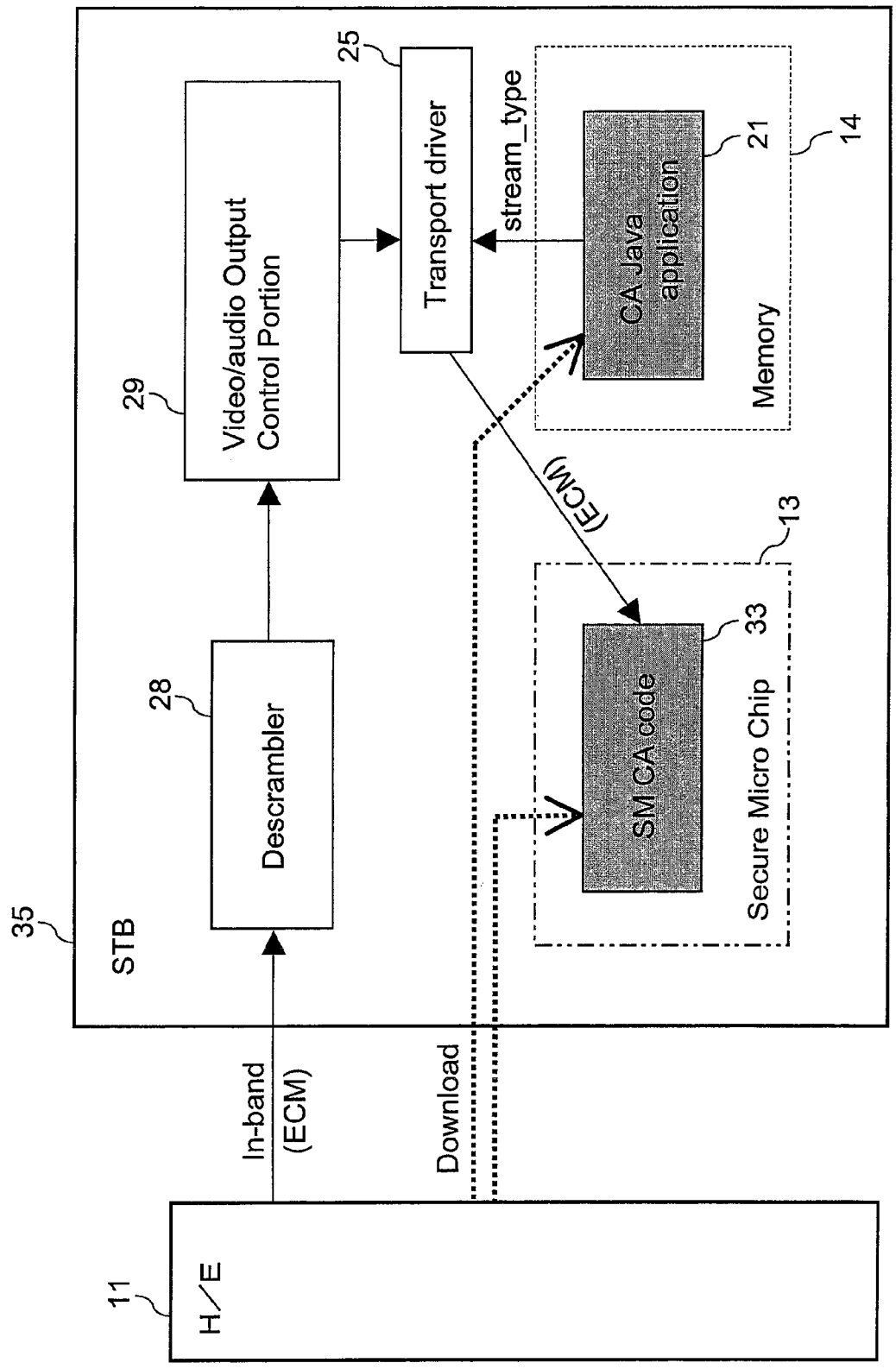
FIG. 6 is an overview block diagram showing the flow of a first ECM extraction process of the STB according to a second embodiment of the present invention.

FIG. 6 shows an overview block diagram showing the flow of a first ECM extraction process of the STB according to the second embodiment. The same symbols are used for the same components as those in FIG. 1.

An STB 35 of the second embodiment can have the software downloaded not only on the secure micro chip 13 but also to a memory 14 on the DCAS HOST (STB 35 body).

A CA Java application 21 shown in FIG. 6 is the software downloaded from the H/E 11 to the memory 14, which performs the decryption process together with the SM CA code 33. Therefore, the CA Java application 21 is also created by the CA vendor who knows the information on the transmitting side as with the SM CA code 33.

As for the STB 35 of the second embodiment, the CA Java application 21 passes the steam-type of the packet including the ECM to the transport driver 25. And the transport driver 25 extracts the packet including the ECM so as to pass the packet to the SM CA code 33.

The STB 35 of the second embodiment is an example of each of the digital video receiver, ECM extract equipment, EMM extract equipment, scramble key extract equipment and CCI extract equipment of the present invention.

A description will be given by using FIG. 7 as to details of the first ECM extraction process of the STB 35 according to the second embodiment.

Figure 7:
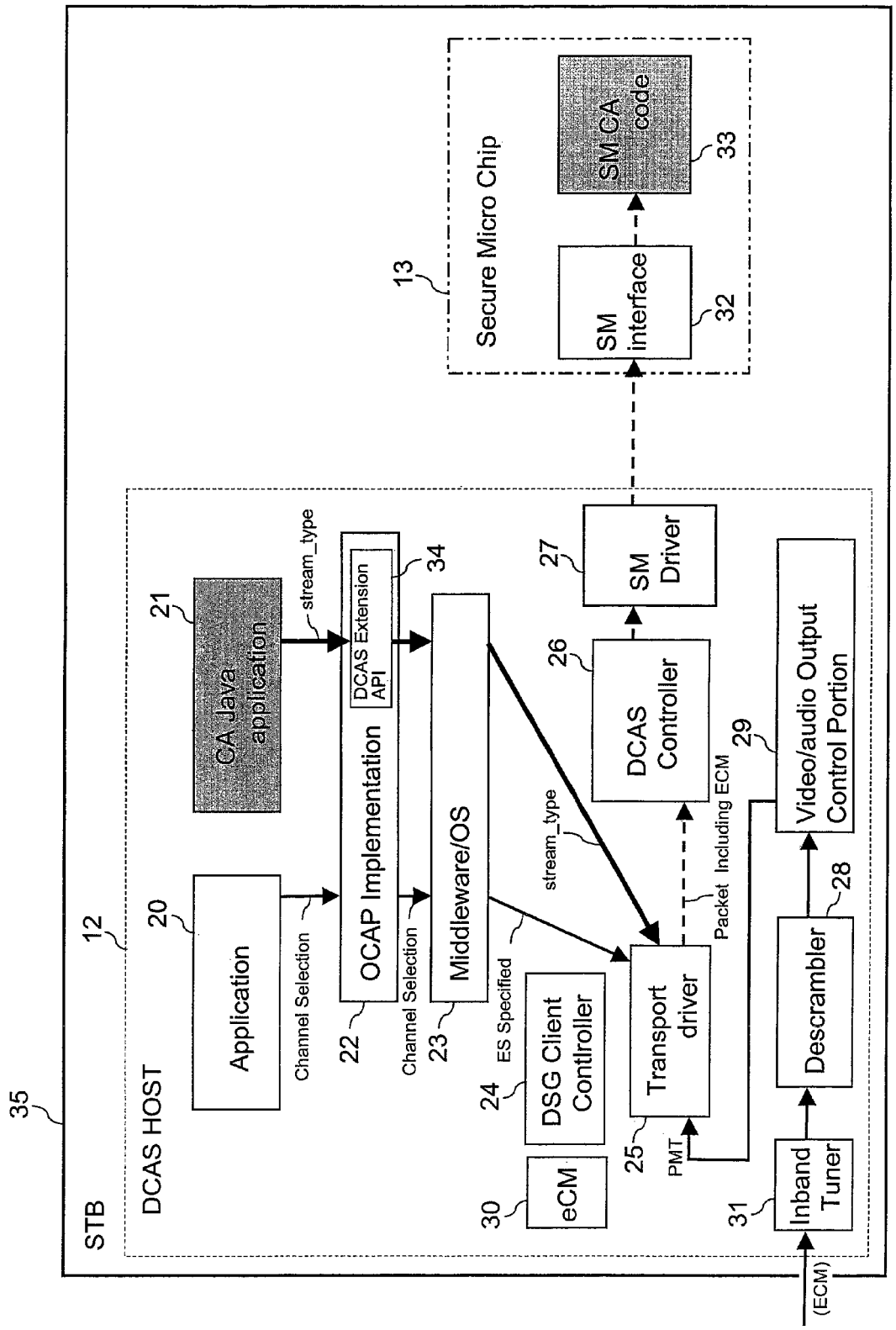
FIG. 7 is a block diagram showing the flow of the first ECM extraction process of the STB according to the second embodiment of the present invention.

FIG. 7 is a block diagram showing the flow of the first ECM extraction process of the STB 35 according to the second embodiment. The same symbols are used for the same components as those in FIGS. 2 to 5.

The STB 35 of the second embodiment has the configuration in which the CA Java application 21 is added to the STB 10 of the first embodiment. Thus, it is possible to perform the decryption process by, out of the process of the STB 10 of the first embodiment shown in FIGS. 2 to 5, only replacing the ECM extraction process shown in FIG. 2 with the first ECM extraction process of the second embodiment described below and leaving the rest as processed in the first embodiment.

The CA Java application 21 is an example of a second decryption control unit of the present invention.

If the channel selection operation is performed by the application 20, the OCAP implementation 22 and the middleware/OS 23 are notified of the channel selection information. And the middleware/OS 23 specifies the ES (Elementary Stream) to the transport driver 25.

The OCAP implementation 22 of the STB 35 of the second embodiment has a DCAS extension API 34 for notifying the transport driver 25 of the stream_type built therein.

Upon selecting the channel, the CA Java application 21 notifies the DCAS extension API 34 of the OCAP implementation 22 as to the stream_type of the packet including the ECM of the private section. The DCAS extension API 34 passes the stream_type to the transport driver 25 via the middleware/OS 23.

The stream_type is an example of the first information of the present invention.

The video/audio output control portion 29 inputs the PMT extracted out of the data inputted from the inband tuner 31 via the descrambler 28 to the transport driver 25.

And the transport driver 25 extracts the packet including the ECM of the stream_type passed from the DCAS extension API 34 out of the PMT inputted from the video/audio output control portion 29 so as to transmit the packet to the SM CA code 33 via the DCAS controller 26, the SM driver 27 and the SM interface 32. The SM CA code 33 extracts the ECM out of the passed packet. The broken line arrow shown in FIG. 7 indicates the flow of the packet including the ECM of the stream_type set up by the CA Java application 21.

Figure 8:
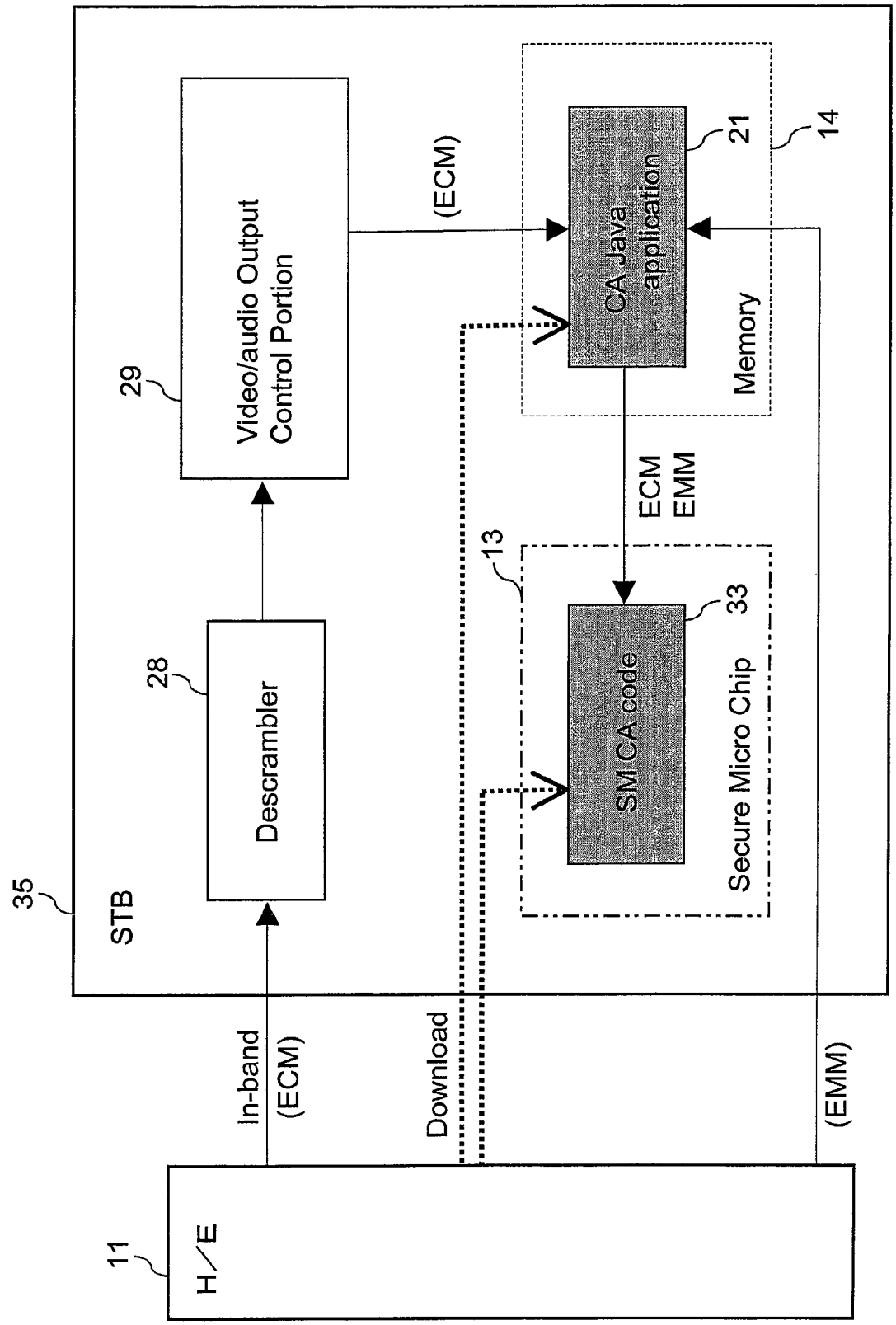
FIG. 8 is an overview block diagram showing the flow of a second ECM extraction process and the EMM extraction process of the STB according to the second embodiment of the present invention.

FIG. 8 shows an overview block diagram showing the flow of the second ECM extraction process and EMM extraction process of the STB 35 according to the second embodiment of the present invention. Although FIG. 8 shows the same configuration as FIG. 6, the flow of the process is different from that of FIG. 6.

As in the case of the first ECM extraction process of the second embodiment shown in FIG. 6, the second ECM extraction process and EMM extraction process are performed by the downloaded SM CA code 33 and CA Java application 21. In the case of FIG. 8, the CA Java application 21 extracts the ECM and EMM and passes them to the SM CA code 33.

Next, details of the second ECM extraction process of the STB 35 according to the second embodiment will be described by using FIG. 9.

Figure 9:
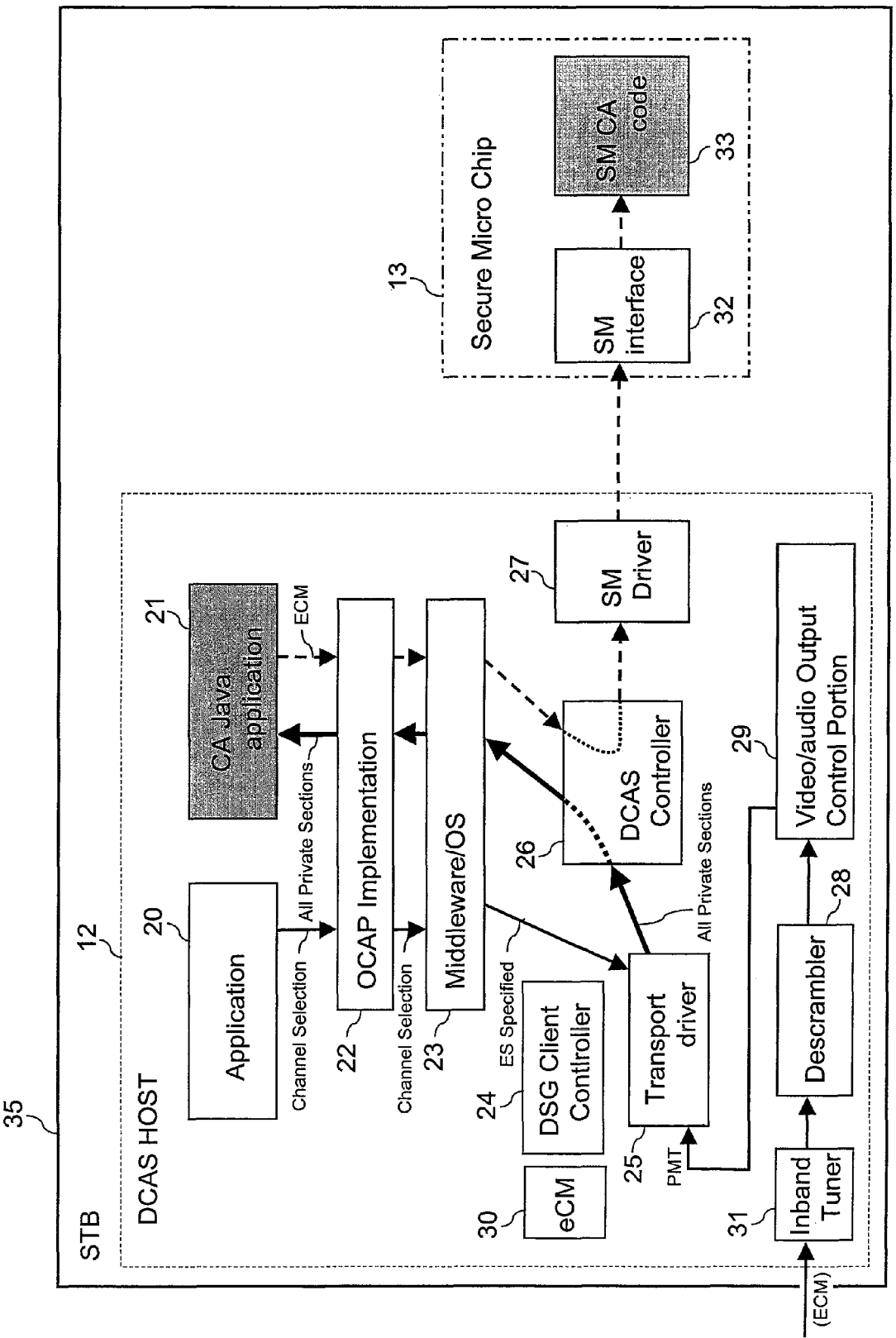
FIG. 9 is a block diagram showing the flow of the second ECM extraction process of the STB according to the second embodiment of the present invention.

FIG. 9 is a block diagram showing the flow of the second ECM extraction process of the STB 35 according to the second embodiment. The same symbols are used for the same components as those in FIGS. 2 to 5.

As in the case of the first ECM extraction process described in FIG. 7, the STB 35 of the second embodiment has the configuration in which the CA Java application 21 is added to the STB 10 of the first embodiment. Thus, it is possible to perform the decryption process by, out of the process of the STB 10 of the first embodiment shown in FIGS. 2 to 5, only replacing the ECM extraction process shown in FIG. 2 with the second ECM extraction process of the second embodiment described below and leaving the rest as processed in the first embodiment.

If the channel selection operation is performed by the application 20, the OCAP implementation 22 and the middleware/OS 23 are notified of the channel selection information. And the middleware/OS 23 specifies the ES (Elementary Stream) to the transport driver 25.

The video/audio output control portion 29 inputs the PMT extracted out of the data inputted from the inband tuner 31 via the descrambler 28 to the transport driver 25.

And the transport driver 25 extracts the private sections out of the PMT inputted from the video/audio output control portion 29 so as to pass all the private sections including those other than the packet including the ECM to the CA Java application 21 via the DCAS controller 26, the middleware/OS 23 and the OCAP implementation 22.

The CA Java application 21 extracts the ECMs out of all the private sections passed from the transport driver 25, and transmits them to the SM CA code 33 via the OCAP implementation 22, the middleware/OS 23, the DCAS controller 26, the SM driver 27 and the SM interface 32.

The CA Java application 21 is the software created by the CA vendor, where the value of the stream_type and the structure of the packet including the ECM are known. Therefore, the CA Java application 21 can extract the ECMs out of all the private sections passed from the transport driver 25.

The broken line arrow shown in FIG. 9 indicates the flow of the ECM extracted by the CA Java application 21.

Figure 10:
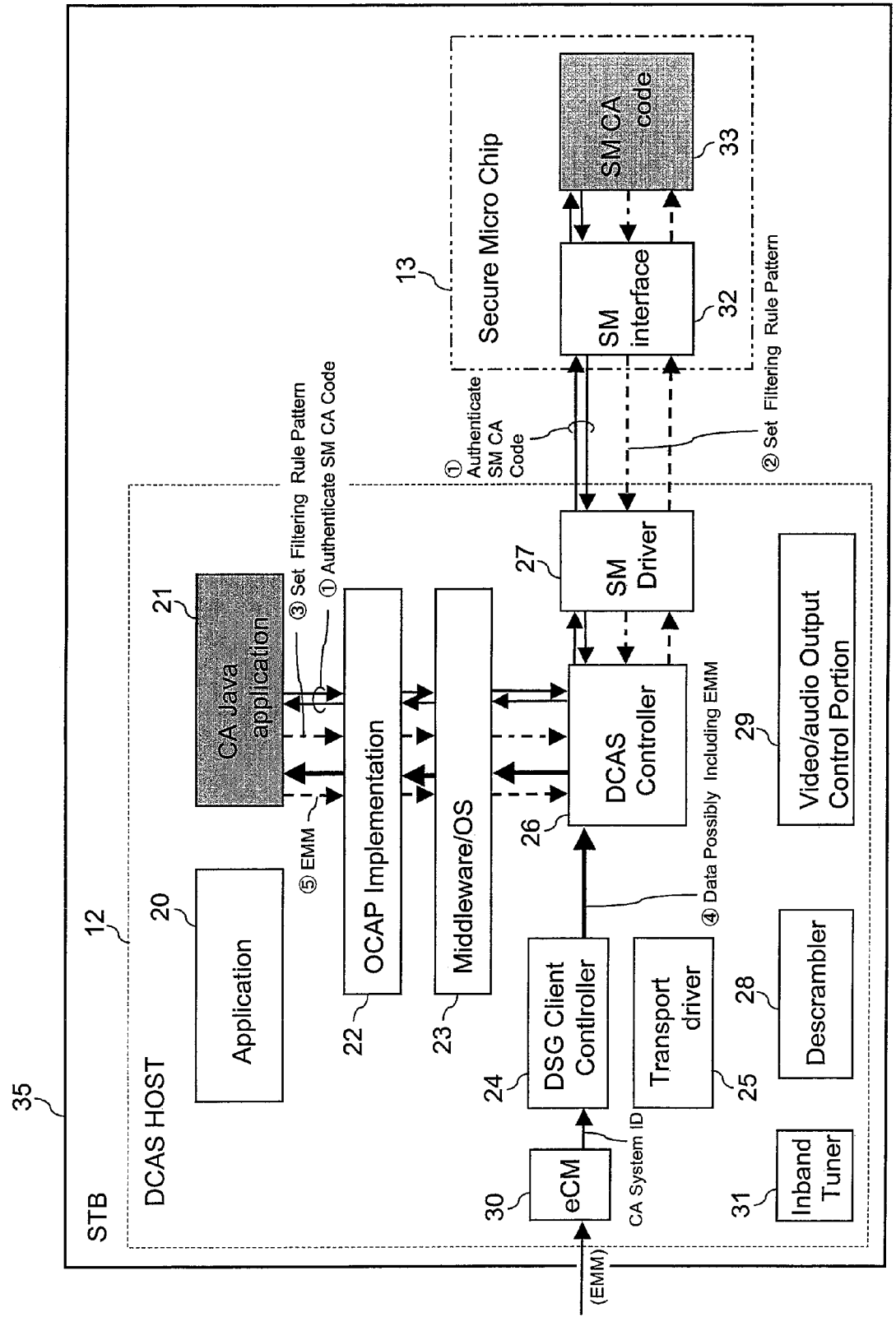
FIG. 10 is a block diagram showing the flow of the EMM extraction process of the STB according to the second embodiment of the present invention.

Next, details of the EMM extraction process of the STB 35 according to the second embodiment will be described by using FIG. 10. FIG. 10 has the same configuration as FIG. 9, where the flow of the EMM extraction process is indicated by the arrows among the blocks. A circled number added to the processing descriptions with the arrow indicates the order in which the process is performed.

The STB 35 of the second embodiment has the configuration in which the CA Java application 21 is added to the STB 10 of the first embodiment. Thus, it is possible to perform the decryption process by, out of the process of the STB 10 of the first embodiment shown in FIGS. 2 to 5, only replacing the EMM extraction process shown in FIG. 3 with the EMM extraction process of the second embodiment described below and leaving the rest as processed in the first embodiment.

First, the CA Java application 21 requires authentication information for identifying the SM CA code 33, and so it authenticates the SM CA code 33 via the OCAP implementation 22, the middleware/OS 23, the DCAS controller 26, the SM driver 27 and the SM interface 32.

Once the SM CA code 33 is identified, the SM CA code 33 sets the filtering rule pattern on the DCAS controller 26 via the SM interface 32 and the SM driver 27. The SM CA code 33 has the data to be a subject of comparison set up in the filtering rule pattern.

Once the SM CA code 33 is identified, the CA Java application 21 also sets the filtering rule pattern on the DCAS controller 26 via the OCAP implementation 22 and the middleware/OS 23. The CA Java application 21 has an area to be extracted for comparison set up in the filtering rule pattern.

The filtering rule pattern set by the SM CA code 33 is an example of the second information of the present invention, and the filtering rule pattern set by the CA Java application 21 is an example of third information of the present invention.

And the DSG client controller 24 determines the destinations and extracts the data which may include the EMM intended for the STB 35 out of the data (CA System ID) rendered as a session received by the eCM 30, and transmits the data to the DCAS controller 26.

Out of the data possibly including the EMM passed from the DSG client controller 24, the DCAS controller 26 extracts the data for comparison existing in the area to be extracted for comparison by using each of the filtering rule patterns set by the SM CA code 33 and the CA Java application 21 so as to pass the data for comparison to the CA Java application 21 via the middleware/OS 23 and the OCAP implementation 22.

The CA Java application 21 is the software created by the CA vendor, where the structure of the data for comparison passed from the DCAS controller 26 is known. Therefore, the CA Java application 21 extracts the necessary EMM out of the data, and transmits the EMM to the SM CA code 33 via the OCAP implementation 22, the middleware/OS 23, the DCAS controller 26, the SM driver 27 and the SM interface 32.

The broken line arrow shown in FIG. 10 indicates the flow of the EMM extracted by the CA Java application 21.

Figure 11:
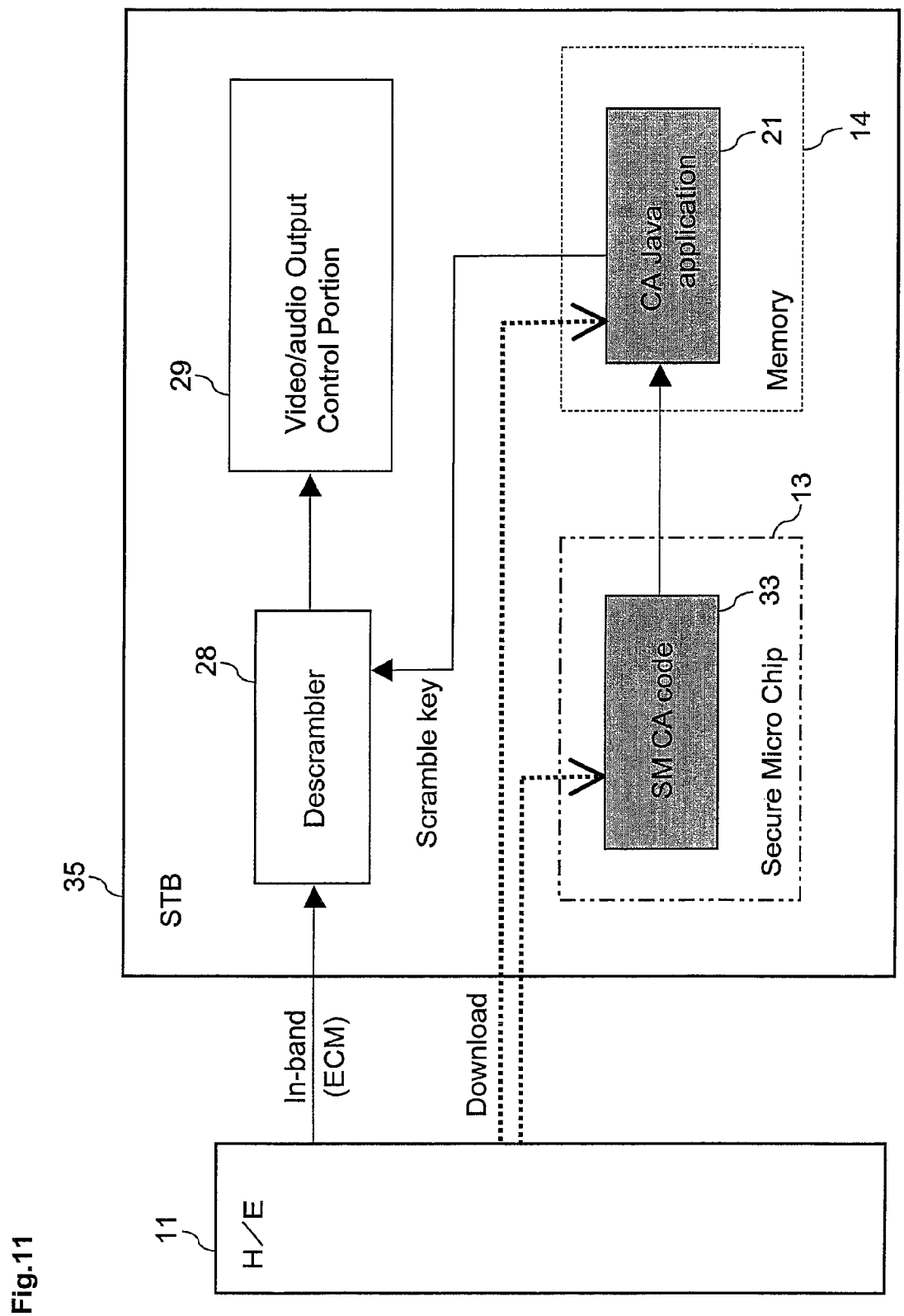
FIG. 11 is an overview block diagram showing the flow of the scramble key extraction process of the STB according to the second embodiment of the present invention.

Next, FIG. 11 shows an overview block diagram showing the flow of the scramble key extraction process of the STB 35 according to the second embodiment of the present invention.

The scramble key extraction process is performed by the downloaded SM CA code 33 and CA Java application 21. In the case of FIG. 11, the CA Java application 21 extracts the scramble key and passes it to the descrambler 28.

Next, details of the scramble key extraction process of the second embodiment will be described by using FIG. 12.

Figure 12:
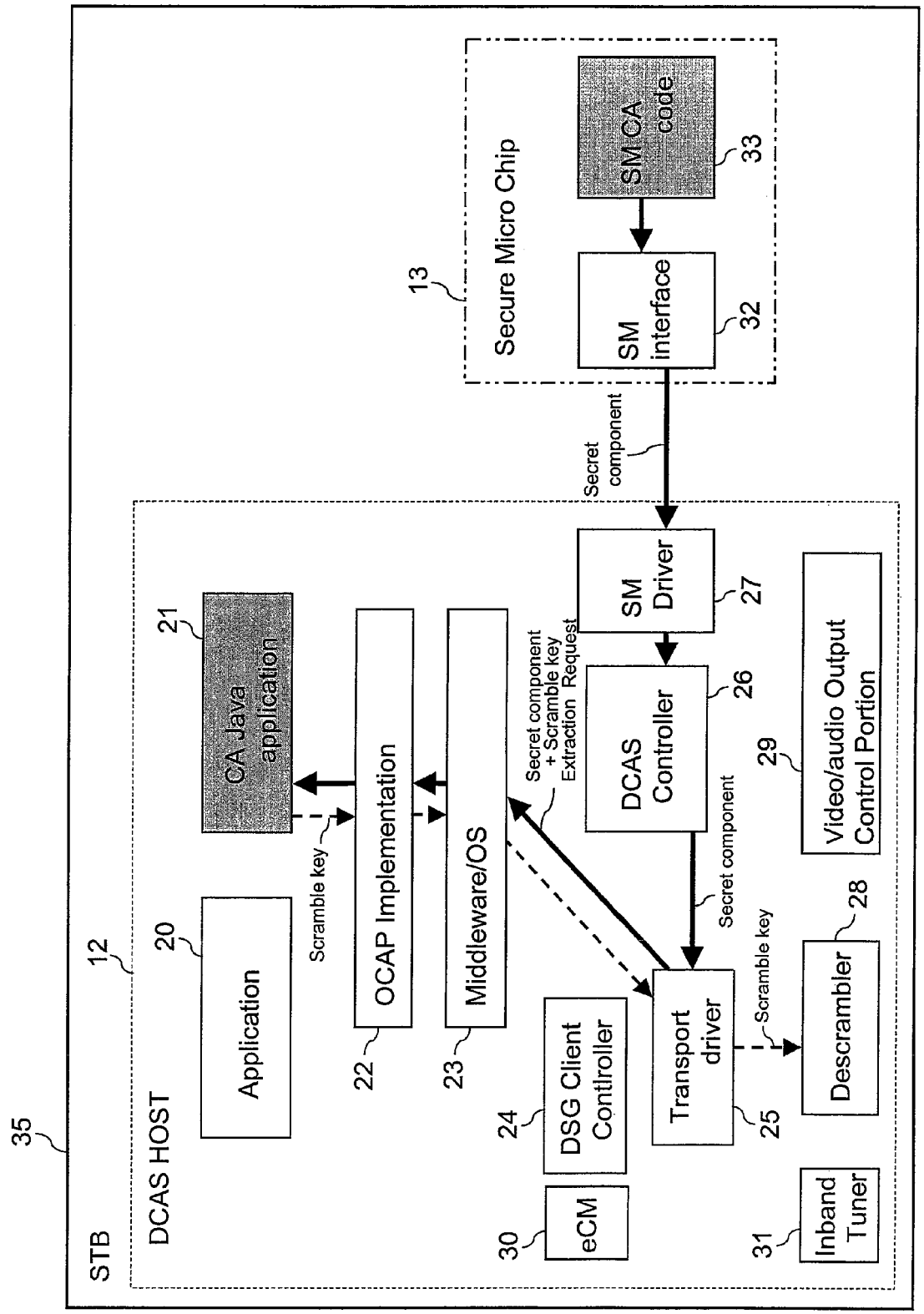
FIG. 12 is a block diagram showing the flow of the scramble key extraction process of the STB according to the second embodiment of the present invention.

FIG. 12 is a block diagram showing the flow of the scramble key extraction process of the STB 35 according to the second embodiment. FIG. 12 has the same configuration as FIG. 9, where the flow of the scramble key extraction process is indicated by the arrows among the blocks.

The STB 35 of the second embodiment has the configuration in which the CA Java application 21 is added to the STB 10 of the first embodiment. Thus, it is possible to perform the decryption process by, out of the process of the STB 10 of the first embodiment shown in FIGS. 2 to 5, only replacing the scramble key extraction process shown in FIG. 4 with the scramble key extraction process of the second embodiment described below and leaving the rest as processed in the first embodiment.

The SM CA code 33 decrypts the scramble key from the ECM and the EMM by using the master key, and generates the secret component which includes its scramble key. And the SM CA code 33 transmits the secret component to the transport driver 25 via the SM interface 32, the SM driver 27 and the DCAS controller 26.

The secret component generated by the SM CA code 33 is an example of the fourth information of the present invention.

The transport driver 25 having received the secret component passes the secret component together with a request for extracting the scramble key to the CA Java application 21 via the middleware/OS 23 and the OCAP implementation 22.

The CA Java application 21 is the software created by the CA vendor, where the structure of the secret component is known. Therefore, the CA Java application 21 extracts the scramble key out of the secret component upon receiving the request for extracting the scramble key. And the CA Java application 21 passes the scramble key to the descrambler 28 via the OCAP implementation 22, the middleware/OS 23 and the transport driver 25.

In the case of the first embodiment shown in FIG. 4, it is assumed that the transport driver 25 can extract the scramble key from the secret component, which is based on the premise that the format of the secret component has been disclosed. In the case of the second embodiment in FIG. 12, the CA Java application 21 extracts the scramble key out of the secret component, and so the transport driver 25 does not need to know the structure of the secret component. Therefore, the STB 35 can be manufactured even if the format of the secret component is not disclosed.

Next, details of the CCI extraction process of the STB 35 according to the second embodiment will be described by using FIG. 13.

Figure 13:
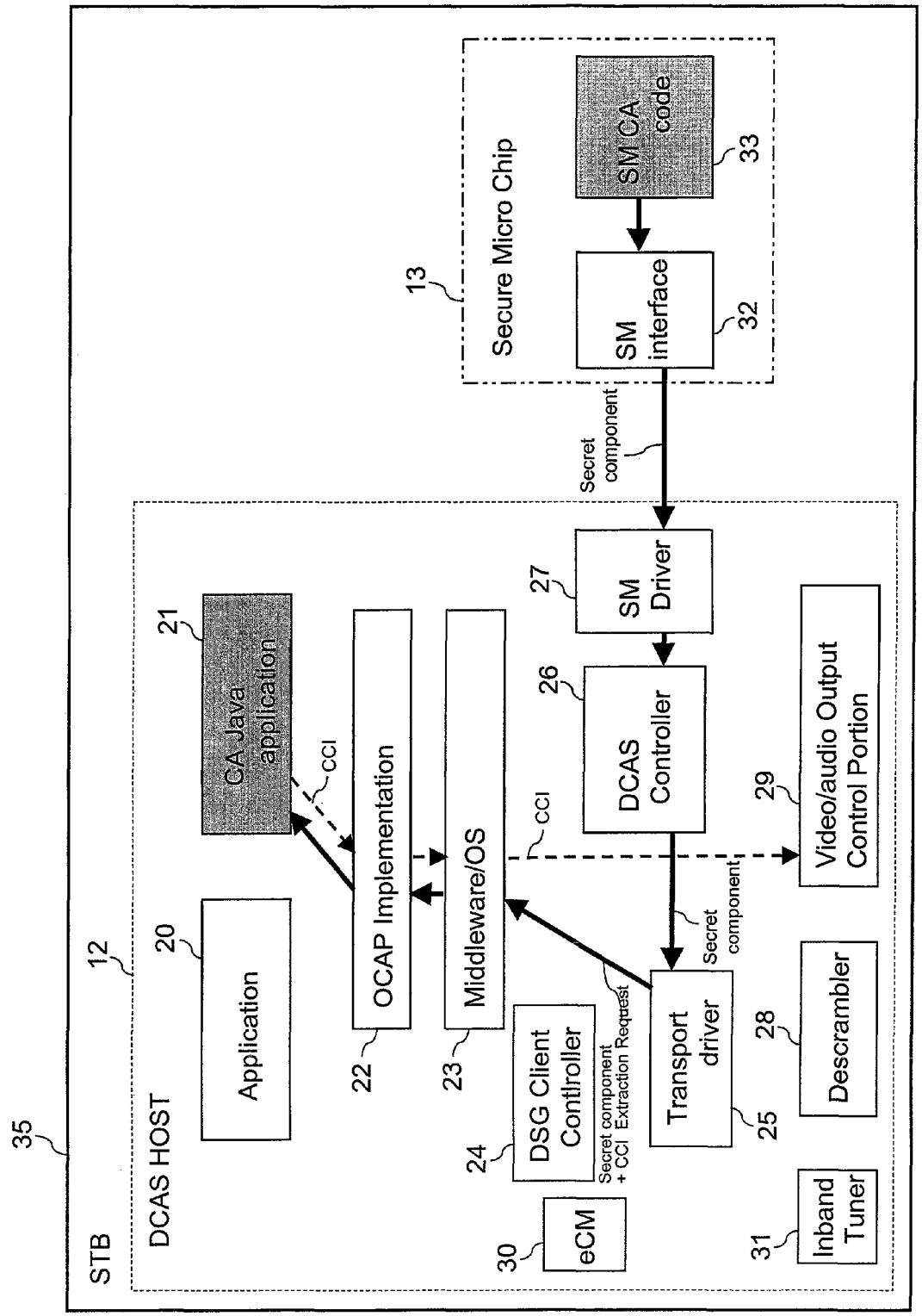
FIG. 13 is a block diagram showing the flow of the CCI extraction process of the STB according to the second embodiment of the present invention.

FIG. 13 is a block diagram showing the flow of the CCI extraction process of the STB 35 according to the second embodiment. FIG. 13 has the same configuration as FIG. 9, where the flow of the CCI extraction process is indicated by the arrows among the blocks.

The STB 35 of the second embodiment has the configuration in which the CA Java application 21 is added to the STB 10 of the first embodiment. Thus, it is possible, out of the process of the STB 10 of the first embodiment shown in FIGS. 2 to 5, to only replace the CCI extraction process shown in FIG. 5 with the CCI extraction process of the second embodiment described below and leave the rest as processed in the first embodiment.

The SM CA code 33 creates the secret component which includes the CCI and transmits it to the transport driver 25 via the SM interface 32, the SM driver 27 and the DCAS controller 26.

And the transport driver 25 passes the secret component together with the request for extracting the CCI to the CA Java application 21 via the middleware/OS 23 and the OCAP implementation 22.

The CA Java application 21 knows the structure of the secret component. Therefore, the CA Java application 21 extracts the CCI out of the secret component upon receiving the request for extracting the CCI, and passes the CCI to the video/audio output control portion 29 via the OCAP implementation 22 and the middleware/OS 23.

The above describes that each of the ECM extraction process, the EMM extraction process, the scramble key extraction process and the CCI extraction process described in the second embodiment is replaceable with the process of the first embodiment corresponding to each process. However, those processes can be combined anyhow by adopting the configuration of the STB 35 of the second embodiment shown in FIG. 7 and the like.

It is possible, by using the STB 35 of the second embodiment, to enjoy the advantage of the CableCARD that the receiver can be manufactured without knowing the information necessary for the decryption process as with the STB 10 of the first embodiment. At the same time, it is possible to manufacture the STB 35 at lower cost than the CableCARD. Thus, the STB 35 of the second embodiment is rich in general versatility.

Furthermore, according to the second embodiment, the CA Java application 21 is provided not only on the SM CA code 33 on the secure micro chip 13 but also on the STB 35 body side as the software to be downloaded for the decryption process. It is thereby possible, in the decryption process requiring high confidentiality, to have the SM CA code 33 on the secure micro chip 13 perform the process requiring higher confidentiality and have the CA Java application 21 perform the process requiring a high throughput and difficult for the secure micro chip 13 to process.

To be more specific, it is possible to design the decryption process without worrying about the throughput of a decryption processing portion, and so it becomes easier to design the decryption process.

Third Embodiment

Figure 14:
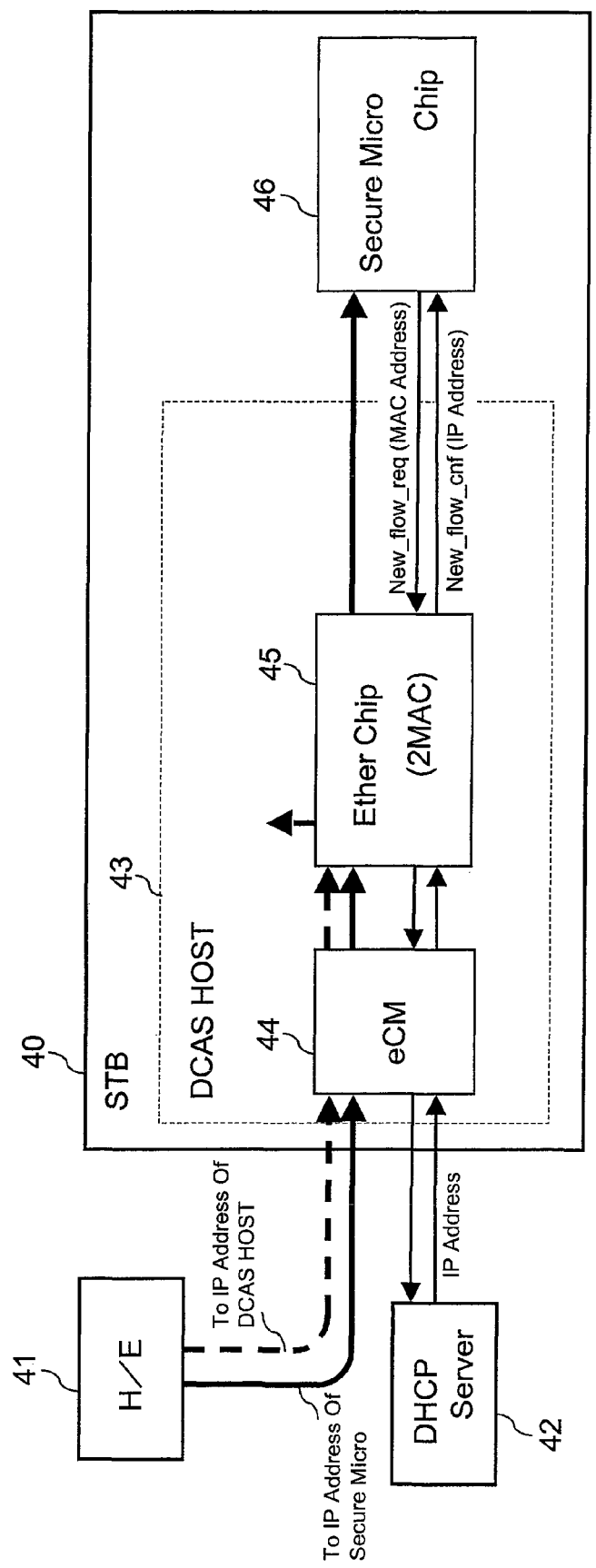
FIG. 14 is a block diagram showing a data flow due to two MAC addresses of the STB according to a third embodiment of the present invention.

FIG. 14 shows an overview block diagram of a digital video receiving system according to a third embodiment of the present invention.

The digital video receiving system according to the third embodiment has an STB 40 connected to an H/E 41 of a cable TV station.

The STB 40 of the third embodiment is an example of the digital video receiver of the present invention.

The STB 40 of the third embodiment is composed of a secure micro chip 46 for performing the decryption process and a DCAS HOST 43 as the portion other than the secure micro chip 46 as with the first and second embodiments.

An eCM 44 is equivalent to the eCM 30 shown in FIG. 2 and the like.

An Ether chip 45 is a chip for controlling Ethernet data, which is also the chip mounted on the STBs of the first and second embodiments although it is not described in FIGS. 1 to 13.

A DHCP server 42 is a general DHCP server for assigning an IP address corresponding to a received MAC address.

Next, a description will be given as to the receiving method of the STB 40 according to the third embodiment.

The Ether chip 45 of the STB 40 has the MAC address for the secure micro chip 46 apart from the MAC address for the STB 40. To be more specific, the Ether chip 45 has two different MAC addresses, which are the MAC address for the DCAS HOST 43 and the MAC address for the secure micro chip 46.

Upon receiving a request for acquiring an IP address from the secure micro chip 46, the Ether chip 45 transmits the MAC address for the secure micro chip 46 which is separate from the MAC address for the DCAS HOST 43 to the DHCP server 42 via the eCM 44 so as to acquire the IP address assigned to the MAC address from the DHCP server 42. Similarly, the DCAS HOST 43 also has the IP address separate from that for the secure micro chip 46 assigned thereto.

When receiving the data from the H/E 41, the Ether chip 45 sorts delivery destinations of the received data according to destination IP addresses of the received data. The data intended for the IP address assigned to the DCAS HOST 43 is delivered to the DCAS HOST 43. On the other hand, the data intended for the IP address assigned to the secure micro chip 46 is not delivered to the DCAS HOST 43 but is delivered to the secure micro chip 46.

Thus, the H/E 41 can directly pass the data desired to be transmitted to the secure micro chip 46 to the secure micro chip 46 in the STB 40 without passing it through the DCAS HOST.

When extracting the EMM necessary for the decryption process, the DCAS HOST 43 conventionally extracted the data including the necessary EMM out of the data including many other EMMs. According to the third embodiment, however, the data can be directly transmitted to the secure micro chip 46 so that it is possible to transmit only the data including the EMM necessary for the STB 40 from the H/E 41 to the secure micro chip 46.

To be more specific, a processing burden resulting from the EMM extraction is alleviated on the DCAS HOST 43, and traffic between the H/E 41 and the DCAS HOST 43 can also be reduced.

The configuration of the third embodiment in which the Ether chip 45 has two MAC addresses is also applicable to the STBs in the configurations of the first and second embodiments.

In each of the embodiments, the same software of the SM CA code and the CA Java application is downloaded to each of the multiple STBs serviced by the same CA vendor. The master key used for each of the STBs, which is different STB-by-STB (depending on each STB), is preset in each of the STBs instead of being downloaded with the SM CA code and the CA Java application. As the master key used for each of the STBs is preset in each of the STBs, it is possible to control each of the STBs according to requirements of each of the STBs by using the same SM CA code and CA Java application.

Each of the embodiments was described by taking a cable TV system as an example. However, the digital video receiver and the like of the present invention are not limited to the cable TV system but are also applicable to a broadcasting system for performing a conditional access system such as satellite broadcasting.

A recording medium of the present invention is the recording medium having a program recorded therein, which program causes a computer to execute all or part of the functions of all or part of the units of the stream input unit, the STB control unit, the descrambler and the video/audio output control portion belonging to the above-mentioned digital video receiver of the present invention. It is a computer-readable recording medium wherein the read program executes the functions in cooperation with the computer.

The recording medium of the present invention is the recording medium having a program recorded therein, which program causes a computer to execute all or part of the functions of the first decryption control unit and/or the second decryption control unit belonging to the above-mentioned digital video receiver of the present invention. It is the computer-readable recording medium wherein the read program executes the functions in cooperation with the computer.

The above "part of the units" of the present invention means one or a few units out of those multiple instruments.

The above "functions of the units" of the present invention means all or part of the functions of the units.

A form of use of the program of the present invention may be an aspect of being recorded on the computer-readable recording medium and operating in cooperation with the computer.

As for the recording media, a ROM and the like are included.

The above-mentioned computer of the present invention is not limited to pure hardware such as a CPU but may include firmware, OS and peripherals in addition.

As described above, the configuration of the present invention may be realized either softwarewise or hardwarewise.

The digital video receiver, according to the present invention can be manufactured without knowing the information on the transmitting side necessary for the decryption process, and at low cost and has the advantage of being rich in general versatility. The digital video receiver, digital video receiving method and the like according to the present invention are useful as the digital video receiver, digital video receiving method and the like for the cable television, satellite broadcasting and the like using the CAS.

What is claimed is:

1. A set top box (STB) for receiving a stream including scrambled programs, entitlement control messages (ECM) including information about the scrambled programs, and entitlement management messages (EMM) including information about the subscriber, the STB descrambling the scrambled programs, and reproducing the descrambled programs for a subscriber based on a permission program from a vendor, the STB comprising:
 a programmable decryption chip receiving the ECM and the EMM;
 a descrambler receiving the scrambled programs; and
 a video output controller reproducing the descrambled programs,
 wherein the STB is manufactured such that the programmable decryption chip does not include the permission program of the vendor,
 wherein subsequent to manufacturing of the STB, the programmable decryption chip downloads and executes the permission program from the vendor, the permission program having instructions from the vendor for extracting the ECM and EMM from the stream, and decrypting an encrypted scramble key based on the extracted ECM and EMM, and
 wherein the descrambler descrambles the scrambled programs based on the decrypted scramble key and transmits the descrambled programs to the video output controller for reproduction, and subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

2. Entitlement control messages (ECM) extract equipment, comprising:
 a second decryption control unit which notifies a first information for extracting a packet including an ECM out of a stream;
 a stream input unit which has the stream including the ECM inputted thereto and extracts the packet including the ECM based on the first information obtained from the second decryption control unit;
 a first decryption control unit which extracts the ECM from the packet extracted by the stream input unit; and
 a programmable decryption process chip that subsequent to manufacturing of the ECM extract equipment, downloads and executes a permission program from a vendor, the permission program having instructions from the vendor for extracting the ECM, and decrypting an encrypted scramble key based on the extracted ECM,
 wherein the ECM extract equipment is manufactured such that the programmable decryption process chip does not include the permission program of the vendor, and subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

3. A non-transitory computer readable storage medium having a program recorded therein to cause a computer to function as the stream input unit of the ECM extract equipment according to claim 2.

4. Entitlement management messages (EMM) extract equipment, comprising:
 a first decryption control unit which generates a second information data including an EMM and data including no EMM;
 a set top box (STB) control unit which has the data including the EMM and the data including no EMM inputted thereto, extracts only the data including the EMM based on the second information set up from the first decryption control unit and transmits it to the first decryption control unit; and
 a programmable decryption process chip that subsequent to manufacturing of the EMM extract equipment, downloads and executes a permission program from a vendor, the permission program having instructions from the vendor for extracting the EMM, and decrypting an encrypted scramble key based on the extracted EMM,
 wherein the EMM extract equipment is manufactured such that the programmable decryption process chip does not include the permission program of the vendor, and subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

5. A non-transitory computer readable storage medium having a program recorded therein to cause a computer to function as the STB control unit of the EMM extract equipment according to claim 4.

6. Scramble key extract equipment, comprising:
a first decryption control unit which generates a fourth information including a scramble key decrypted based on an entitlement control message (ECM) and an entitlement management message (EMM);
a stream input unit which extracts the scramble key from the fourth information obtained from the first decryption control unit;
a descrambler which descrambles received video receiving data by utilizing the scramble key obtained from the stream input unit; and
a programmable decryption process chip that subsequent to manufacturing of the scramble key extract equipment, downloads and executes a permission program from a vendor, the permission program having instructions from the vendor for extracting the ECM and the EMM from a received stream, and decrypting the encrypted scramble key based on the extracted ECM and EMM,
wherein the scramble key extract equipment is manufactured such that the programmable decryption process chip does not include the permission program of the vendor, and subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

7. A non-transitory computer readable storage medium having a program recorded therein to cause a computer to function as the stream input unit and the descrambler of the scramble key extract equipment according to claim 6.

8. Copy control information (CCI) extract equipment, comprising:
a first decryption control unit which generates a fourth information including CCI;
a stream input unit which extracts the CCI from the fourth information obtained from the first decryption control unit;
a video/audio output control portion which outputs inputted video receiving data according to the CCI obtained from the stream input unit; and
a programmable decryption process chip that subsequent to manufacturing of the CCI extract equipment, downloads and executes a permission program from a vendor, the permission program having instructions from the vendor for extracting the CCI from the stream,
wherein the CCI extract equipment is manufactured such that the programmable decryption process chip does not include the permission program of the vendor, and subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

9. A non-transitory computer readable storage medium having a program recorded therein to cause a computer to function as the stream input unit and the video/audio output control portion of the CCI extract equipment according to claim 8.

10. A digital video receiver, comprising:
entitlement control message (ECM) extract equipment comprising:
a second decryption control unit which notifies a first information for extracting a packet including an ECM out of a stream;
a stream input unit which extracts the packet including the ECM based on the first information obtained from the second decryption control unit;
a first decryption control unit which extracts the ECM from the packet extracted by the stream input unit;
entitlement management message (EMM) extract equipment comprising:
a first decryption control unit which generates a second information including information data including an EMM and data including no EMM, the EMM extracts the EMM;
a set top box (STB) control unit which has the data including the EMM and the data including no EMM inputted thereto, extracts only the data including the EMM based on the second information set up from the first decryption control unit and transmits it to the first decryption control unit;
scramble key extract equipment comprising:
a first decryption control unit which generates a fourth information including a scramble key restored from an ECM and an EMM;
a stream input unit which extracts the scramble key from the fourth information obtained from the first decryption control unit;
a descrambler which descrambles received video receiving data by utilizing the scramble key obtained from the stream input unit; and
a programmable decryption process chip that subsequent to manufacturing of the digital video receiver, downloads and executes a permission program from a vendor, the permission program having instructions from the vendor for implementing the first decryption control unit and the second decryption control unit for extracting the ECM and EMM from the stream, and decrypting the encrypted scramble key based on the extracted ECM and EMM,
wherein the digital video receiver is manufactured such that the programmable decryption process chip does not include the permission program of the vendor, and subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

11. The digital video receiver according to claim 10, further comprising the CCI extract equipment comprising:
a first decryption control unit which generates fourth information including CCI;
a stream input unit which extracts the CCI from the fourth information obtained from the first decryption control unit;

a video/audio output control portion which outputs inputted video receiving data according to the CCI obtained from the stream input unit; and
a decryption process chip which performs a decryption process, wherein:
the first decryption control unit is software downloaded to a memory on the decryption process chip from outside.

12. A digital video receiving system, comprising:
the digital video receiver according to claim 10;
a digital video transmitter which transmits video data including an ECM, data including no EMM and data including an EMM and causes the first decryption control unit and the second decryption control unit to be downloaded to the digital video receiver; and
a communication line which connects the digital video transmitter with the digital video receiver.

13. A non-transitory computer readable storage medium having a program recorded therein to cause a computer to function as the stream input unit, the STB control unit, the descrambler and the first decryption control unit and/or the second decryption control unit of the digital video receiver according to claim 10.

14. A digital video receiver, comprising:
a programmable decryption process chip that subsequent to manufacturing of the digital video receiver, downloads and executes a permission program from a vendor, the permission program having instructions from the vendor for extracting entitlement control messages (ECM) and entitlement management messages (EMM) from a received stream, and decrypting an encrypted scramble key based on the extracted ECM and EMM,
wherein the digital video receiver is manufactured such that the programmable decryption process chip does not include the permission program of the vendor;
a descrambler for descrambling programs received by the receiver based on the decrypted scramble key; and
an Ether chip for controlling Ethernet data, which has another media access control (MAC) address for the programmable decryption process chip apart from a MAC address used to assign an internet protocol (IP) address used when receiving video receiving data from outside,
wherein subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

15. An entitlement control message (ECM) extract method, comprising the steps in which:
a second decryption control unit notifies a stream input unit of first information for extracting a packet including an ECM, the second decryption control unit is downloaded to a memory different from the memory on a programmable decryption process chip for performing a decryption process;
the stream input unit extracts the packet including the ECM out of the inputted stream based on the first information; and
a first decryption control unit extracts the ECM from the extracted packet,
wherein the programmable decryption process chip subsequent to manufacturing of the first decryption control unit, downloads and executes a permission program from a vendor, the permission program having instructions from the vendor for extracting the ECM from the stream, and decrypting an encrypted scramble key based on the extracted ECM,
wherein the first decryption control unit is manufactured such that the programmable decryption process chip does not include the permission program of the vendor, and subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

16. A digital video receiving method, comprising:
the ECM extract method according to claim 15;
the EMM extract method, comprising the steps in which:
a first decryption control unit generates second information including information for, out of data including an EMM and data including no EMM, extracting only the data including the EMM, the first decryption control unit downloaded to a memory on a decryption process chip for performing a decryption process from outside;
an STB control unit extracts, based on the second information, only the data including the EMM from the data including the EMM and data including no EMM which are inputted; and
the first decryption control unit extracts the EMM from the extracted data including the EMM; and
the scramble key extract method comprising the steps in which:
a first decryption control unit generates fourth information including a scramble key restored from an ECM and an EMM, the first decryption control unit downloaded to a memory on a decryption process chip for performing a decryption process from outside;
a stream input unit extracts the scramble key from the fourth information; and
a descrambler descrambles received video receiving data by utilizing the scramble key extracted by the stream input unit.

17. The digital video receiving method, comprising:
the ECM extract method according to claim 15;
the EMM extract method, comprising the steps in which:
a first decryption control unit generates second information including information for, out of data including an EMM and data including no EMM, extracting only the data including the EMM, the first decryption control unit downloaded to a memory on a decryption process chip for performing a decryption process from outside;
an STB control unit extracts, based on the second information, only the data including the EMM from the data including the EMM and data including no EMM which are inputted; and
the first decryption control unit extracts the EMM from the extracted data including the EMM; and
the scramble key extract method comprising the steps in which:
a first decryption control unit generates fourth information including a scramble key restored from an ECM and an EMM, the first decryption control unit downloaded to a memory on a decryption process chip for performing a decryption process from outside;
a stream input unit extracts the scramble key from the fourth information; and
a descrambler descrambles received video receiving data by utilizing the scramble key extracted by the stream input unit, further comprising the CCI extract method comprising the steps in which:
a first decryption control unit generates fourth information including CCI, the first decryption control unit downloaded to a memory on a decryption process chip for performing a decryption process from outside;
a stream input unit extracts the CCI from the fourth information; and
a video/audio output control portion outputs inputted video receiving data according to the CCI extracted by the stream input unit.

18. An entitlement management message (EMM) extract method, comprising the steps in which:
a first decryption control unit generates second information having data including an EMM and data including no EMM, extracting only the data including the EMM, the first decryption control unit is downloaded to a memory on a programmable decryption process chip for performing a decryption process;
a set top box (STB) control unit extracts, based on the second information, only the data including the EMM and data including no EMM which are inputted; and
the first decryption control unit extracts the EMM from the extracted data,
wherein the programmable decryption process chip subsequent to manufacturing of the first decryption control unit, downloads and executes a permission program from a vendor, the permission program having instructions from the vendor for extracting the EMM from the stream, and decrypting an encrypted scramble key based on the extracted EMM,
wherein the first decryption control unit is manufactured such that the programmable decryption process chip does not include the permission program of the vendor, and subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

19. A scramble key extract method, comprising the steps in which:
a first decryption control unit generates fourth information including a scramble key decrypted based on an entitlement control message (ECM) and an entitlement management message (EMM), the first decryption control unit downloaded to a memory on a programmable decryption process chip for performing a decryption process,
wherein the programmable decryption process chip subsequent to manufacturing of the first decryption control unit, downloads and executes a permission program from a vendor, the permission program having instructions from the vendor for extracting the ECM and the EMM from the stream, and decrypting the scramble key based on the extracted ECM and EMM,
wherein the first decryption control unit is manufactured such that the programmable decryption process chip does not include the permission program of the vendor;
a stream input unit extracts the scramble key from the fourth information; and
a descrambler descrambles received video receiving data by utilizing the decrypted scramble key,
wherein subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

20. A copy control information (CCI) extract method, comprising the steps in which:
a first decryption control unit generates fourth information including CCI, the first decryption control unit downloaded to a memory on a programmable decryption process chip for performing a decryption process,
wherein the programmable decryption process chip subsequent to manufacturing of the first decryption control unit, downloads and executes a permission program from a vendor, the permission program having instructions from the vendor for extracting the CCI from a received stream,
wherein the first decryption control unit is manufactured such that the programmable decryption process chip does not include the permission program of the vendor;
a stream input unit extracts the CCI from the fourth information; and
a video/audio output control portion outputs inputted video receiving data according to the CCI extracted by the stream input unit,
wherein subsequent to downloading and executing the permission program from the vendor, the programmable decryption chip downloads and executes an other permission program from an other vendor, the other permission program having instructions from the other vendor for extracting the ECM and EMM from the stream, and decrypting an encrypted scramble key based on the extracted ECM and EMM.

* * * * *